US007392390B2

(12) United States Patent
Newcombe

(10) Patent No.: US 7,392,390 B2
(45) Date of Patent: Jun. 24, 2008

(54) METHOD AND SYSTEM FOR BINDING KERBEROS-STYLE AUTHENTICATORS TO SINGLE CLIENTS

(75) Inventor: Christopher Richard Newcombe, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 638 days.

(21) Appl. No.: 10/318,349

(22) Filed: Dec. 11, 2002

(65) Prior Publication Data

US 2003/0172269 A1      Sep. 11, 2003

Related U.S. Application Data

(60) Provisional application No. 60/341,079, filed on Dec. 12, 2001.

(51) Int. Cl.
*H04L 9/00* (2006.01)
*G06F 7/04* (2006.01)
*G06F 7/58* (2006.01)
(52) U.S. Cl. .................. 713/170; 713/178; 713/168; 726/10; 726/21
(58) Field of Classification Search ............. 726/10; 713/155, 170, 178
See application file for complete search history.

(56) References Cited

U.S. PATENT DOCUMENTS

| 4,310,720 A | 1/1982 | Check, Jr. |
| 4,920,487 A | 4/1990 | Baffes |
| 4,999,766 A | 3/1991 | Peters et al. |
| 5,305,389 A | 4/1994 | Palmer |
| 5,325,526 A | 6/1994 | Cameron et al. |
| 5,343,526 A | 8/1994 | Lassers |
| 5,349,643 A | 9/1994 | Cox et al. |
| 5,495,533 A | 2/1996 | Linehan et al. |

(Continued)

FOREIGN PATENT DOCUMENTS

EP    0841615    5/1998

(Continued)

OTHER PUBLICATIONS

Microsoft Windows 2000 Server; Windows 2000 Kerberos Authentication; White Paper; pp. 1-42.

(Continued)

*Primary Examiner*—Kambiz Zand
*Assistant Examiner*—Christopher J Brown
(74) *Attorney, Agent, or Firm*—Darby & Darby PC; John W. Branch

(57) ABSTRACT

A method and system are directed towards enabling authentication in a distributed environment. The method employs a hashed salted password associated with a user in part to pre-authenticate the user. If the user is pre-authenticated, a ticket is transmitted to a client. The ticket includes a cryptographic digest of a concatenation of the local and remote addresses that is exclusive or'ed with a timestamp to generate a modified authenticator. The modified authenticator is directed at binding the timestamp to the client to minimize reuse of an authenticator. A packet that includes the authenticator is sent to a server. The server is configured to determine another remote and local IP address associated with the packet. Employing the remote and local addresses, the server extracts the timestamp from the modified authenticator. If the timestamp is within a pre-determined time window, the user may be authenticated.

33 Claims, 14 Drawing Sheets

U.S. PATENT DOCUMENTS

| | | | |
|---|---|---|---|
| 5,535,276 A | 7/1996 | Ganesan | |
| 5,606,693 A | 2/1997 | Nilsen et al. | |
| 5,613,089 A | 3/1997 | Hornbuckle | |
| 5,619,716 A | 4/1997 | Nonaka et al. | |
| 5,634,107 A | 5/1997 | Yumoto et al. | |
| 5,732,275 A | 3/1998 | Kullick et al. | |
| 5,737,495 A | 4/1998 | Adams et al. | |
| 5,742,829 A | 4/1998 | Davis et al. | |
| 5,757,919 A | 5/1998 | Herbert et al. | |
| 5,764,992 A | 6/1998 | Kullick et al. | |
| 5,808,690 A | 9/1998 | Rich | |
| 5,819,082 A | 10/1998 | Marion | |
| 5,829,001 A | 10/1998 | Li et al. | |
| 5,835,601 A | 11/1998 | Shimbo et al. | |
| 5,850,535 A | 12/1998 | Maystrovsky et al. | |
| 5,862,339 A | 1/1999 | Bonnaure et al. | |
| 5,915,112 A | 6/1999 | Boutcher | |
| 5,924,094 A * | 7/1999 | Sutter | 707/10 |
| 5,926,624 A | 7/1999 | Katz et al. | |
| 5,933,835 A | 8/1999 | Adams et al. | |
| 5,960,189 A | 9/1999 | Stupek, Jr. et al. | |
| 5,970,143 A | 10/1999 | Schneier | |
| 5,982,893 A | 11/1999 | Hughes | |
| 5,999,740 A | 12/1999 | Rowley | |
| 6,009,528 A * | 12/1999 | Teraoka | 726/22 |
| 6,018,717 A | 1/2000 | Lee et al. | |
| 6,029,175 A | 2/2000 | Chow et al. | |
| 6,105,074 A | 8/2000 | Yokote et al. | |
| 6,119,203 A | 9/2000 | Snyder et al. | |
| 6,122,372 A | 9/2000 | Hughes | |
| 6,122,657 A | 9/2000 | Hoffman, Jr. et al. | |
| 6,154,767 A | 11/2000 | Altschuler et al. | |
| 6,195,622 B1 | 2/2001 | Altschuler et al. | |
| 6,223,166 B1 * | 4/2001 | Kay | 705/26 |
| 6,256,773 B1 | 7/2001 | Bowman-Amuah | |
| 6,269,400 B1 | 7/2001 | Douglas et al. | |
| 6,292,889 B1 | 9/2001 | Fitzgerald et al. | |
| 6,314,409 B2 | 11/2001 | Schneck et al. | |
| 6,317,786 B1 | 11/2001 | Yamane et al. | |
| 6,332,198 B1 | 12/2001 | Simons et al. | |
| 6,338,072 B1 | 1/2002 | Durand et al. | |
| 6,351,775 B1 | 2/2002 | Yu | |
| 6,366,947 B1 | 4/2002 | Kavner | |
| 6,381,742 B2 | 4/2002 | Forbes et al. | |
| 6,397,258 B1 | 5/2002 | Tsuji et al. | |
| 6,430,608 B1 | 8/2002 | Shaio | |
| 6,438,141 B1 | 8/2002 | Hanko et al. | |
| 6,453,353 B1 | 9/2002 | Win et al. | |
| 6,466,979 B1 | 10/2002 | Plouffe, Jr. | |
| 6,473,793 B1 | 10/2002 | Dillon et al. | |
| 6,487,455 B1 | 11/2002 | Balasubramanian | |
| 6,505,255 B1 | 1/2003 | Akatsu et al. | |
| 6,578,054 B1 | 6/2003 | Hopmann et al. | |
| 6,578,102 B1 | 6/2003 | Batchelor et al. | |
| 6,584,568 B1 | 6/2003 | Dircks et al. | |
| 6,611,812 B2 | 8/2003 | Hurtado et al. | |
| 6,618,810 B1 | 9/2003 | Dirie | |
| 6,675,382 B1 | 1/2004 | Foster | |
| 6,678,700 B1 | 1/2004 | Moore et al. | |
| 6,684,396 B1 | 1/2004 | Brittain et al. | |
| 6,694,450 B1 | 2/2004 | Kidder et al. | |
| 6,711,593 B1 | 3/2004 | Gordon et al. | |
| 6,718,549 B1 | 4/2004 | Narin et al. | |
| 6,721,786 B1 | 4/2004 | Gordon et al. | |
| 6,735,601 B1 | 5/2004 | Subrahmanyam | |
| 6,738,970 B1 | 5/2004 | Kruger et al. | |
| 6,748,470 B2 | 6/2004 | Goldick | |
| 6,751,608 B1 | 6/2004 | Cohen et al. | |
| 6,752,313 B1 | 6/2004 | Caviles et al. | |
| 6,754,821 B1 | 6/2004 | Berson et al. | |
| 6,766,428 B2 | 7/2004 | Saulsbury et al. | |
| 6,771,290 B1 | 8/2004 | Hoyle | |
| 6,775,704 B1 * | 8/2004 | Watson et al. | 709/229 |
| 6,799,276 B1 | 9/2004 | Belissent | |
| 6,807,542 B2 | 10/2004 | Bantz et al. | |
| 6,829,649 B1 | 12/2004 | Shorey et al. | |
| 6,848,028 B1 | 1/2005 | Sugumar et al. | |
| 6,862,616 B1 | 3/2005 | Tompkins | |
| 6,868,539 B1 | 3/2005 | Travison et al. | |
| 6,871,344 B2 | 3/2005 | Grier et al. | |
| 6,871,345 B1 | 3/2005 | Crow et al. | |
| 6,880,086 B2 | 4/2005 | Kidder et al. | |
| 6,883,168 B1 | 4/2005 | James et al. | |
| 6,912,520 B2 | 6/2005 | Hankin et al. | |
| 6,938,005 B2 | 8/2005 | Iverson et al. | |
| 6,950,523 B1 * | 9/2005 | Brickell et al. | 380/286 |
| 6,961,341 B1 | 11/2005 | Krishnan | |
| 6,986,133 B2 | 1/2006 | O'Brien et al. | |
| 6,996,599 B1 | 2/2006 | Anders et al. | |
| 7,000,230 B1 | 2/2006 | Murray et al. | |
| 7,035,943 B2 | 4/2006 | Yamane et al. | |
| 7,131,111 B2 | 10/2006 | Passanisi | |
| 7,143,143 B1 | 11/2006 | Thompson | |
| 2002/0029244 A1 | 3/2002 | Suzuki et al. | |
| 2002/0035526 A1 | 3/2002 | Kutaragi et al. | |
| 2002/0059408 A1 | 5/2002 | Pattabhiraman et al. | |
| 2002/0075844 A1 | 6/2002 | Hagen | |
| 2002/0150253 A1 * | 10/2002 | Brezak et al. | 380/281 |
| 2002/0166117 A1 | 11/2002 | Abrams et al. | |
| 2002/0172222 A1 | 11/2002 | Ullmann et al. | |
| 2003/0009365 A1 | 1/2003 | Tynan et al. | |
| 2003/0039211 A1 | 2/2003 | Hvostov et al. | |

FOREIGN PATENT DOCUMENTS

| | | |
|---|---|---|
| EP | 1150207 | 10/2001 |
| GB | 2348721 | 10/2000 |
| WO | 0161486 | 8/2001 |

OTHER PUBLICATIONS

International Preliminary Examining Authority, Written Opinion for PCT/US02/39975 dated May 31, 2006, 6 pages.

Rajiv Jauhari et al.: "Priority-Hints: An Algorithm for Priority-Based Buffer Management," Proceedings of the 16th VLDB Conference, Brisbane, Australia, 1990, pp. 708-721.

* cited by examiner

METHOD AND SYSTEM FOR BINDING KERBEROS-STYLE AUTHENTICATORS TO SINGLE CLIENTS

RELATED APPLICATION

This application is a Utility Patent application based on a previously filed U.S. Provisional Patent application, U.S. Ser. No. 60/341,079 filed on Dec. 12, 2001, the benefit of the filing date of which is hereby claimed under 35 U.S.C. § 119(e).

FIELD OF THE INVENTION

The present invention relates generally to computers and more particularly to enabling authentication over a network by binding a Kerberos style authenticator to a single client.

BACKGROUND OF THE INVENTION

Today, some software may be distributed over the Internet. If the software can be packaged in a small executable, a software vendor may choose to distribute the software over the Internet.

Once the software is downloaded, the user may share the downloaded software with a friend. Some Internet sites attempt to limit sharing of the software by requiring a user password, a Compact Disc (CD) key, token, or the like to be provided to the Internet server prior to obtaining access to the software. Typically, should a password, token, or key be shared or stolen, the unauthorized user would still be able to access the software. Therefore, there is a need in the industry for enabling improved authentication in a distributed environment. Thus, it is with respect to these considerations and others that the present invention has been made.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

The present invention is directed to a system and method for enabling authentication in a distributed environment. In one aspect of the present invention, the method is directed to authenticating a client. In the method and system, an authentication request is received by the client. The authentication request includes a modified authenticator encrypted with a hashed salted password associated with a user. The modified authenticator binds a timestamp to the client by associating a remote address and a local address associated with the client to the timestamp. The modified authenticator is decrypted by employing the hashed salted password. The remote address, local address, and decrypted modified authenticator are then employed to authenticate the client.

In still another aspect of the present invention, a computer-readable medium having stored thereon a data structure includes data fields. The data structure represents a ticket granting ticket that is issued to a computer for a user. The data fields include an authentication data field containing data representing a timestamp, a remote IP address, and a local IP address associated with the computer for the user.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
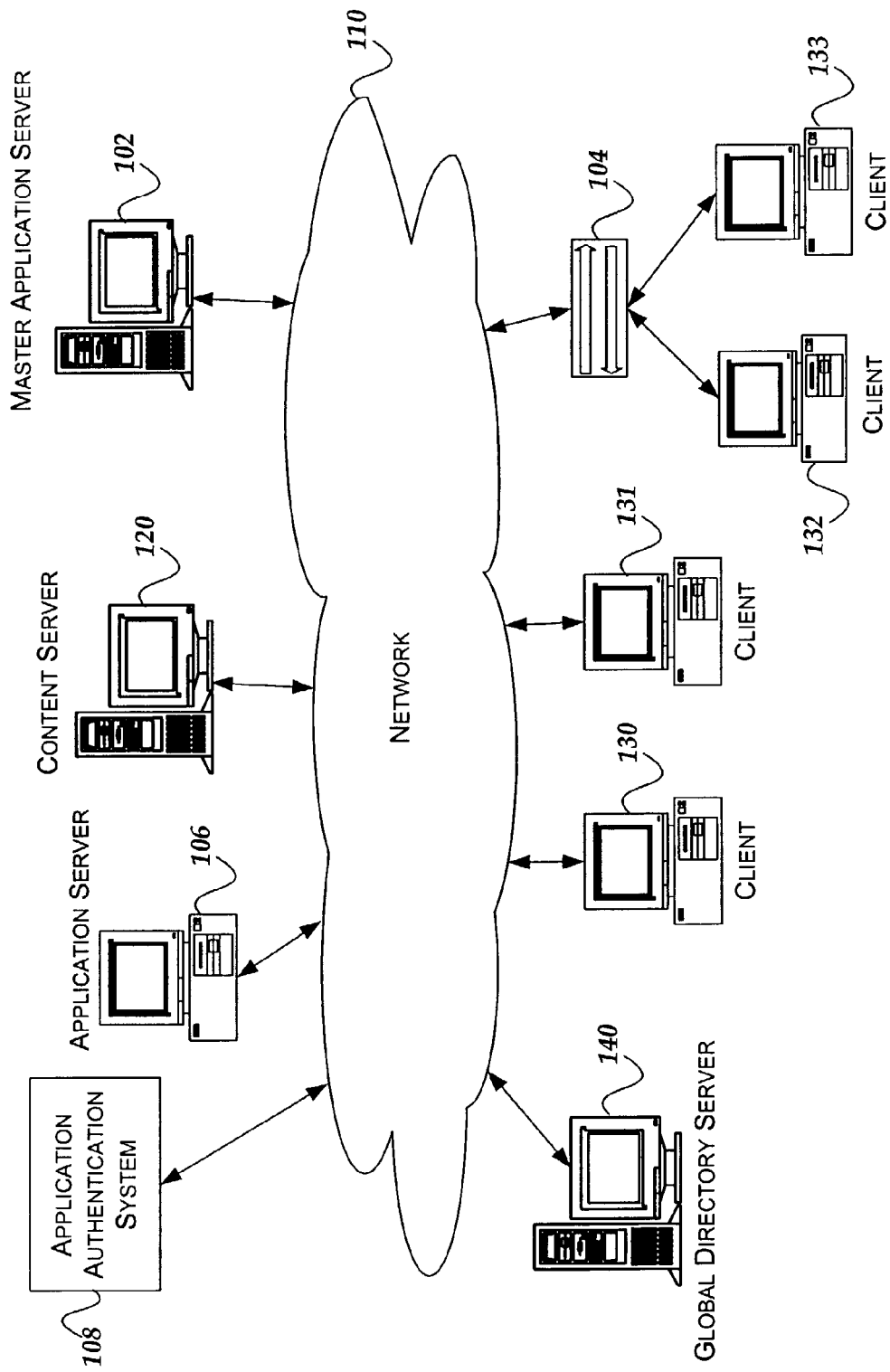
FIG. 1 illustrates a block diagram generally showing an overview of one embodiment in which the invention may be practiced.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Briefly stated, the present invention is directed to a method and system for enabling authentication in a distributed system. The system includes a client that desires access to a content server, application server, or the like. In one embodiment, the authentication manager includes an application authentication server and a ticket-granting server. The client provides a request to the application authentication server that includes a modified authenticator that is associated with a user employing the client. The request also includes information associated with the client's local and remote IP addresses. In one embodiment, the modified authenticator includes a timestamp that is combined with a cryptographically strong digest of a concatenation of the local and remote IP address associated with the client. Combining the addresses with the timestamp may be performed by virtually any information-preserving and reversible mechanism, including an "exclusive or", and the like. The modified authenticator is directed at binding the timestamp to a single client to minimize theft and reuse of an authenticator. The authenticator is encrypted employing a hashed salted password associated with the user. The application authentication server is configured to receive the request and to determine the client's remote IP address from the request. In one embodiment, the client's remote IP address is obtained from a TCP/IP header associated with the client's request. The application authentication server employs the client's local and remote IP addresses, and the user's hashed salted password to extract the timestamp and, in part, authenticate the user.

Encryption and Decryption

Throughout this disclosure, references to encryption and decryption are made. Where appropriate, each reference to an algorithm used to perform encryption or decryption should be construed to include any other algorithm or technique for making it more difficult to obtain the original bytes (also called plaintext) of an application, component of an application, and/or data. For each reference to an algorithm used to perform encryption or decryption throughout this disclosure, it should also be recognized that other embodiments of the invention may be implemented using other encryption algorithms, including the proposed Advanced Encryption Standard (AES) which is Rijndael, RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. These encryption algorithms may use, where appropriate, cipher block chaining mode, cipher feedback mode, CBC ciphertext stealing (CTS), CFB, OFB, counter mode, and/or any other block mode. Other exemplary "encryption" techniques that may be used by embodiments of the invention include compiling source code into binary code, and/or using proprietary data structures to send data. In one embodiment of the invention, Crypto++, an open-source class library of cryptographic techniques, the source code of which is hereby incorporated by reference, may be used in encrypting or decrypting applications and/or data. Other encryption and decryption libraries, both open source, commercial, and/or proprietary may be used.

In one embodiment of the invention, for symmetric encryption and decryption 128-bit keys and the proposed-AES Rjindael cipher may be used in cipher block chaining mode. Random initialization vectors (IVs) may be sent in plaintext. In another embodiment to protect a password stored on a client, 256-bit Rjindael in cipher feedback mode is used with a random IV. In other embodiments of the invention, other symmetric encryption algorithms (such as the ones listed in the previous paragraph) may be used for symmetric encryption and decryption.

In one embodiment of the invention, for asymmetric encryption, 1024-bit keys may be used with RSA. These keys may be formatted according to the "OAEP (with SHA1)" scheme provided by RSA, or any other formatting appropriate. For example, RSA may be used in conjunction with a ticket (which is described in more detail below) to decrypt data in the ticket to recover an AES key that may then be used to decrypt other portions of a ticket. SHA1 stands for Secure Hash Algorithm 1. SHA1 is a cryptographic hash algorithm that p length string. In other embodiments of the invention, other private key/public key encryption algorithms may be used (such as the ones listed above) with the same or different key sizes.

In another embodiment of the invention, a server and/or client may also employ a 128-bit HMAC (hashed message authentication code) and/or 1024-bit RSA digital signatures to assist in authenticating that the contents of a ticket have not been changed and/or in authenticating a client and/or server. The 128-bit HMAC may use SHA1 to create a digest of data. For example, contents of a ticket may be fed into a one way hashing function, such as SHA1, to create a block of binary digits. The hashing function may be such that whatever is inputted into it is hashed into fixed length of bits. For example, the hashing function may return 160 bits whether it operates on 4 bytes of data or on all the text in a dictionary. A RSA signature may be created and/or formatted as described in RSA's PKCS #1, or any other suitable format.

Encryption may be used to protect tickets in a somewhat similar fashion to the Kerberos open protocol from the Massachusetts Institute of Technology (MIT), which is hereby incorporated by reference. Embodiments of the invention that may be used to protect tickets and authenticate clients and/or servers are described below.

Keys may be distributed using 1024-bit RSA and a 128-bit Rjindael symmetric session key. The 1024-bit RSA key may be used to encrypt the 128-bit Rjindael symmetric key. The 128-bit Rjindael key may be used to encrypt the body of a message. To recover a message body, a receiver may use its private RSA key to obtain the 128-bit Rjindael key. Then the 128-bit Rjindael key may be used to decrypt the body of the message. Tickets may include other encrypted 128-bit Rjindael session keys that are sent from one server to another server in a somewhat similar manner to that described in the open Kerberos protocol from MIT.

Encrypted or unencrypted messages or tickets may be sent using TCP/IP, UDP, SSL, IPSEC, or any other networking protocol. Content sent to or from content servers may be encrypted on unencrypted. Random numbers may be generated by any random number generator. An exemplary random number generator that may be used is contained in the CryptoAPI suite, produced by Microsoft Corporation of Redmond, Wash.

It will be recognized that the key sizes given above are illustrative. In other embodiments of the invention, key sizes other than or in addition to the key sizes above may be used when encrypting data and/or authenticating a server, client, or user.

Illustrative Environment

FIG. 1 illustrates a block diagram generally showing an overview of one embodiment in which the present invention may be practiced. As shown in the figure, system 100 includes clients 130-133, Network Address Translation (NAT) server 104, content server 120, Application Authentication System (AAS) 108, Global Directory Server (GDS) 140, application server 106, a master application server 102, and network 110. System 100 may include many more components than those shown in FIG. 1. However, the components shown are sufficient to disclose an illustrative embodiment for practicing the present invention.

As further shown in the figure, NAT server 104 is in communication with clients 132-33, and network 110. Clients 130-131, content server 120, AAS 108, application server 106, and master application server 102, and GDS 140 each are in communication with network 110.

Network 110 can employ any form of computer readable media for communicating information from one electronic device to another. Network 110 can include local area networks (LANs), wide area networks (WANs), direct connections, such as through a universal serial bus (USB) port, other forms of computer-readable media, or any combination thereof. Links within LANs typically include fiber, twisted wire pair or coaxial cable, while links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other known links. Furthermore, remote computers and other related electronic devices can be remotely connected to either LANs or WANs via a modem and temporary telephone link. In FIG. 1, it will be appreciated that the network 110 may comprise a vast number of interconnected networks, computers, and routers and therefore only a representative "cloud" is shown.

The media used to transmit information in the links illustrates one type of computer-readable media, namely communication media. Generally, computer-readable media includes any media that can be accessed by a computing device. Communication media typical embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

NAT server 104 provides IP address translations allowing a single device, such as a router, to act as an agent between the Internet (network 110) and a local network (not shown), enabling a single, unique IP address to represent the enterprise. When a NAT enabled device is employed, the IP address space is typically partitioned into two parts—a reusable set of IP addresses internal to stub domains, and a set of globally unique IP addresses. The reusable IP addresses are typically called internal local IP addresses, or local addresses. The global IP addresses are termed global addresses, external address, or remote addresses. A given address is either a local address or a remote address.

NAT server 104 may include a table comprising of pairs of local addresses and remote addresses. The IP addresses inside the stub domain, the local addresses, typically are not globally unique. Therefore, they may be reused in other domains. As the remote IP addresses are used to communicate to the Internet, these addresses typically are globally registered.

Application server 106 may include virtually any electronic device that is enabled for use by clients 130-133 to simultaneously execute or play an application. For example, application server 106 may provide an "application universe" in which an application is played. It may update or change an application that is currently being played. It may further provide a connection point through which messages sent to and from clients travel on their way to other clients. In one embodiment, Application server 106 receives a user ticket from client 130-133 and forwards the user ticket to a ticket validation server (not shown), AAS 108, or the like, to enable the user to be authenticated. Some devices that may be used as application server 106 include a client such as client 300 shown in FIG. 3 and a server such as server 200 of shown in FIG. 2.

Master application server 102 maintains information about other application servers, such as application server 106. It may be used, for example, to provide a list of application servers that are currently available together with what applications are available on each application server. Master application server 102 may poll other application servers to determine if they are still active. Alternatively, or in addition, application server 106 may report to master application server 102 upon becoming available and periodically as long as application server 106 remains available. When application server 106 reports to master application server 102, master application server 102 may update a database that indicates that application server 106 is available and what applications application server 106 is providing. Some devices that may be used as master application server 102 include a client such as client 300 in FIG. 3 and a server such as server 200 in FIG. 2.

Figure 4:
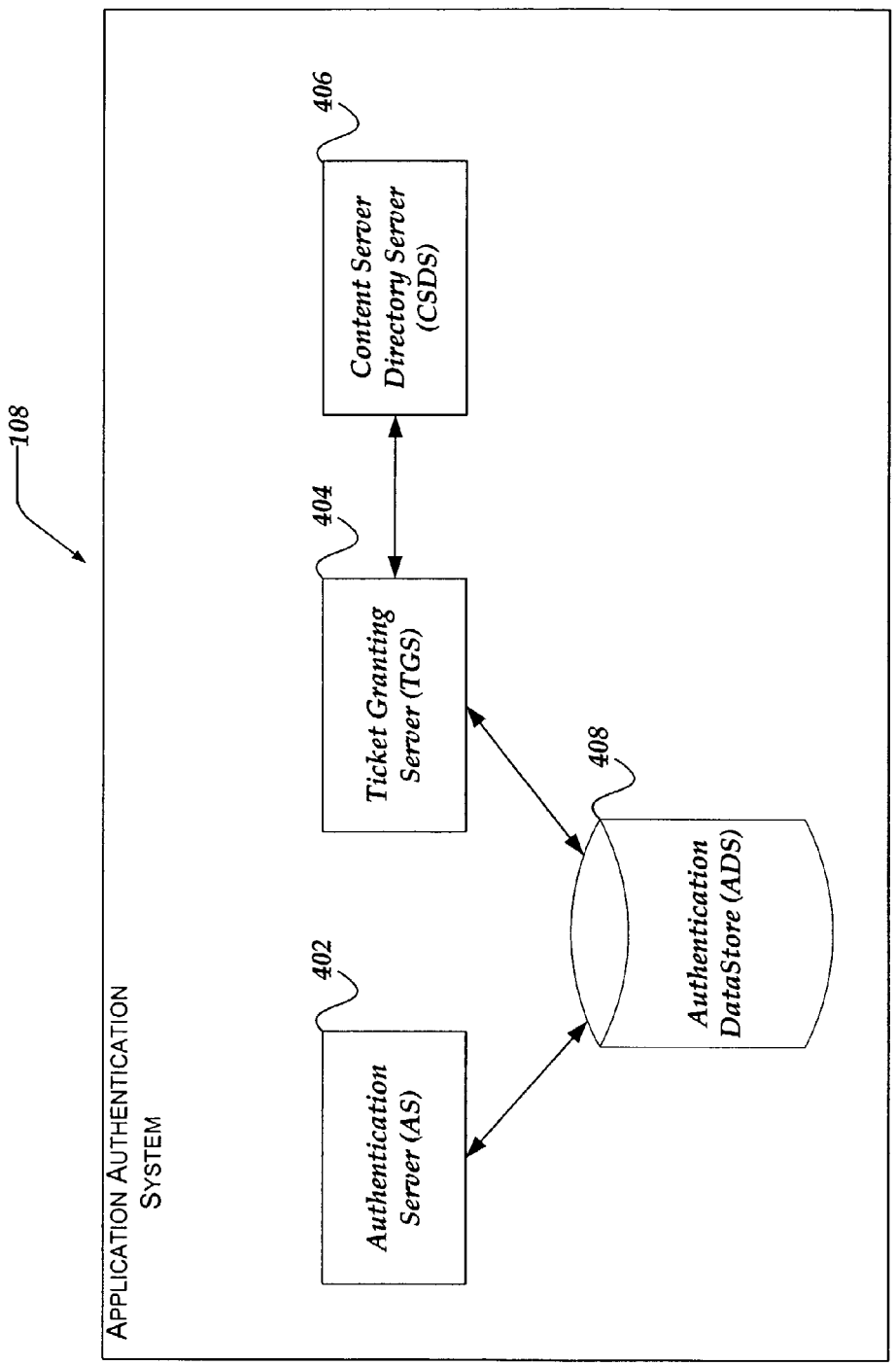
FIG. 4 illustrates a functional block diagram of one embodiment of components of a ticket granting system as shown in FIG. 1.

AAS 108 is shown in more detail in conjunction with FIG. 4. Briefly, however, AAS 108 is configured to authenticate a user, and to provide the authenticated user one or more content tickets that enables the authenticated user to access one or more content servers (120). AAS 108 may or may not be located in a single physical location. Components of the system may be distributed and connect to network 110 at different points. Moreover, in one embodiment, AAS 108 provides information about its location to GDS 140.

Content server 120 may include virtually any electronic device capable of storing content and sending the content to a requesting device. Some devices that may be used as content server 120 include a client such as client 300 of FIG. 3 and a server such as server 200 of FIG. 2.

Content managed by content server 120 includes data, application programs, such as applications, licensing information, and the like. Content may be compressed, encrypted, or unencrypted. Content may be sent to requesters in a compressed, encrypted, or unencrypted format. Moreover, content may be packaged into blocks of data. Associated with the blocks may also be a checksum block. The checksum block provides integrity information associated with the blocks of data. The checksum block may also be in a compressed, encrypted, or unencrypted format.

Content server 120 may authenticate clients 130-133 that send a content ticket that was granted by AAS 108. The content ticket, which is described in more detail below, may include a client readable portion and a server readable portion. The portions may be encrypted such that only entities that have the correct encryption/decryption keys can read each portion.

Content server 120 is also configured to read its portion of the content ticket to verify whether the sending client should be enabled access to the requested content. In one embodiment of the invention, the client's local and remote IP addresses are included in the content ticket. As part of its authentication, content server 120 may validate that a request is coming from both a certain internal IP address and a certain remote IP address identified in the content ticket.

Content server 120 is further configured to invalidate content tickets. For example, when a user logs onto a new client, content tickets that are associated with a prior client may be invalidated to prevent simultaneous use, and the like.

GDS 140 is configured to provide location information about AAS 108 to clients 130-133, application server 106, content server 120, and master application server 102. GDS 140 may receive the location information from AAS 108. Location information may include an IP address, a Universal Resource Locator (URL), Media Access Control (MAC) address, and the like.

Clients 130-133 are described in more detail with reference to FIG. 3 below. Briefly, however, clients 130-133 may include virtually any device capable of sending information to or receiving information from network 110. Clients 130-133 include personal computers, multiprocessor systems, microprocessor-based or programmable consumer electronics, network PCs, minicomputers, mainframe computers, and the like. As shown in FIG. 1, clients 132-133 reside behind NAT server 104 such that the local IP addresses assigned to each client may be hidden from the other devices on network 110, such AAS 108. Moreover, clients 130-133 may be assigned its local IP addresses through various mechanisms, including static assignments, dynamic assignments such as Dynamic Host Configuration Protocol (DHCP), and the like.

Clients 130-133 are enabled to request access to servers, such as content server 120 by requesting content tickets from AAS 108. In one embodiment of the invention, clients 130-133 are enabled to provide information associated with local and remote IP addresses to AAS 108 as part of the request for content tickets. Clients 130-133 may also provide information associated with local and remote IP addresses to content server 120.

FIG. 4 illustrates a functional block diagram of one embodiment of components of AAS 108 as shown in FIG. 1. AAS 108 may include many more components than those shown in FIG. 4. However, the components shown are sufficient to disclose an illustrative embodiment for practicing the present invention. Moreover, the components shown in FIG. 4 may be distributed across a network, multiple servers, clients, and the like. The components may also be within a single server, client, or the like.

AAS 108 includes authentication server (AS) 402, ticket-granting server (TGS) 404, Content Server Directory Server (CSDS) 406, and Authentication Data Store (ADS) 408. As shown in the figure, ADS 408 is in communication with AS 402 and TGS 404. CSDS 406 also is in communication with TGS 404.

CSDS 406 is configured to provide information associated with content servers, including, location, status of a content server's activity, content tickets, and the like. CSDS 406 may be further configured to validate content servers, such as those shown in FIG. 1. Moreover, CSDS 406 may include a database, a flat file, a directory structure, and the like.

ADS 408 is configured to provide storage for information associated with a client, user, ticket, and the like. ADS 408 may also store information about whether a user is currently logged into a content server, application server, AAS 108, and the like. ADS 408 may include a database, a flat file, a directory structure, and the like. In one embodiment, ADS 408 includes password information associated with the user. In another embodiment, the password is stored in a hashed format, employing any of a variety of hashing mechanisms described above. ADS 408 may store a pseudo-random sequence of bits, known as a salt. In one embodiment, the salt is 64-bits in length.

AS 402 operates with TGS 404 to enable a user to obtain access to a content server. AS 402 is enabled to authenticate a user employing an authentication mechanism that has some features similar to the Kerberos model, which is hereby incorporated by reference. For example, AS 402 receives a request for access to a server from a client. The request includes a timestamp, known as a pre-authenticator that is modified with the user's password (e.g. encrypted using the user's hashed salted password as a key). However, unlike Kerberos, the present invention also modifies the timestamp with a digest of the client's local and remote IP addresses before encryption.

Salting the password is directed toward making an attack, such as a dictionary attack, or the like, on the client's stored password more difficult. Salting of the user's password may be achieved by appending a salt obtain from ADS 408 to the user's plaintext password. The salted password is then hashed, employing any of a variety of hashing mechanisms, including those described above. The salt may be provided to the client through a prior communication between AS 402 and the client. Additionally, the hashed salted password may also be provided to AS 402 by the client through a prior encrypted session that employed a public/private encryption key pair associated with AS 402. In one embodiment, the prior session is a create user account session. In another embodiment, to ensure authenticity of the public/private encryption key pair associated with AS 402, and to minimize tampering, the public/private encryption key pair is digitally signed by a Master Application server's private encryption key. In that embodiment, the client may obtain a Master Application server's public encryption key through any of a variety of out-of-band mechanisms, including through a prior purchase of software.

In one embodiment, AS 402 extracts the timestamp from the modified pre-authenticator and pre authenticates the client based at least in part on the timestamp being within an acceptable time window.

AS 402 also examines the client's remote and local IP addresses to determine whether other users are attempting to share the user's account. The client may obtain its IP addresses through a variety of mechanisms including a system call, a prior communication with AS 402, or the like. By requiring the client to provide its IP addresses, the present invention may also minimize the effects of a network address translation described above.

Moreover, AS 402 extracts the client's remote IP address from a TCP/IP packet header associated with the client's request, a system call, or the like, and also obtains the client's remote IP address from within the request. AS 402 may then compare the two remote IP addresses to further validate the client.

AS 402 may also determine whether another client is attempting to employ an account of a user that is currently logged into a content server, or the like. This may arise for example, when a user shares passwords, account information, or the like, or when a user's information has been stolen, or the like. When AS 402 determines that the same user appears to be attempting multiple virtually simultaneous logins, AS 402 may cancel currently authorized tickets issued to that user. The AS 402 may use data in ADS 408 to determine what other tickets were granted to the client. It may then contact each content server for which a content ticket was granted and inform the content server that the content ticket is no longer valid.

The AS 402 may also contact one or more content servers and instruct them to take other actions with respect to a client that attempts to access content with a revoked ticket. For example, the AS 402 may instruct a content server that the client should display a message informing the user that another user is attempting to use tickets the user was previously given, that repeated attempts to obtain or use tickets in this manner may result in suspension of the user's account, and/or other appropriate information. AS 402 may employ other servers, including a CSDS 406, a message server, a set of content servers, and/or any other server to propagate a message that a certain client and/or tickets should be denied access.

If AS 402 determines that the user is a valid user, AS 402 provides the client with a ticket granting ticket (TGT). The TGT typically includes a server readable portion, client readable portion, and a timestamp now called an authenticator.

The client readable portion may include a session key, a lifetime parameter, and the like. The lifetime parameter may include information associated with a time after which the ticket is valid, an expiration time for the ticket, and the like. In one embodiment, the client readable portion is signed with the private key of authentication server of AS 402 so that clients (who have the corresponding public key) can check that it is valid. The client readable portion may be encrypted with the user's hashed salted password. If the user can decrypt a client readable portion, which is so encrypted, and extract and utilize its contents, then other servers have indirect but firm assurance that the user knows their own password (i.e., is authentic). That is, in one embodiment the client proves that it can decrypt the client readable portion by extracting the session key from the client readable portion and using it to encrypt subsequent authenticators. The authenticators are sent to subsequent servers along with the still-encrypted (opaque) and tamper-proof server readable portion. The server decrypts the server readable portion and extracts its copy of the same session key, and uses that to decrypt the authenticator. If the authenticator is decrypted successfully (and passes checks such as the timestamp check) then this proves beyond reasonable doubt that the client had the correct session key, which proves that the client was able to decrypt the client readable portion (i.e. knows their password).

The server readable portion may include the lifetime parameter, session key, user name, an account name associated with the user, and the like. In one embodiment, the server readable portion is signed with a public encryption key associated with the AS 402. Moreover, the server readable portion may also be encrypted by a public encryption key associated with TGS 404. The public encryption keys employed may include any of a variety of public/private encryption key mechanisms including those described above.

In one embodiment, a modified authenticator is provided in addition to the server readable portions. The modified authenticator includes information associated with the client's local IP address, remote IP address, and timestamp. In one embodiment, the client's local and remote IP addresses are concatenated, and hashed, employing any of the cryptographically strong hashing mechanisms described above, to provide a digest. The digest is combined with the timestamp. Combining the addresses with the timestamp may be performed by virtually any information-preserving and reversible mechanism, including an exclusive or, and the like. Associating the timestamp with the client's IP addresses ensures that the timestamp is bound to a single physical client, thereby minimizing the likelihood that an authenticator may be reused by a hacker or shared with a friend. In one embodiment, the modified authenticator is further encrypted with the session key to ensure that the user was able to obtain the session key by decrypting the client readable portion that it received.

Additionally, because the client readable portion is encrypted with the user's hashed salted password, there is, indirectly, further assurance that the user knows their own password (i.e., is authentic).

TGS 404 is configured to receive the server readable portion of the TGT and modified authenticator from the user, and to provide a valid user with a content ticket that enables access to an identified content server. TGS 404 further examines information in and about the server readable portion of the TGT to authenticate the client. For example, TGS 404 may examine a digital signature associated with the server readable portion to validate the source and integrity of the server readable portion. The TGS 404 may also decrypt the readable portion employing its private encryption key. Moreover, TGS 404 may employ the session key to decrypt the modified authenticator. TGS 404 may then 'exclusive or' the modified authenticator with a cryptographically strong digest of the concatenated client's local and remote IP addresses. However, the present invention is not so limited, and the addresses may be combined with the timestamp by virtually any information-preserving and reversible mechanism. In one embodiment, the cryptographically strong digest is derived from SHA1. TGS 404 may obtain the client's remote IP address from the TCP/IP packet header, a system call, or the like. TGS 404 may obtain the client's local IP address from the server readable portion of the TGT. Should either of the IP addresses not match the IP addresses employed to originally generate the modified authenticator then, a resulting timestamp would likely be incorrect. It would be extremely unlikely then that the resulting timestamp would fall within an acceptable time window that TGS 404 employs. Hence, the client would be determined to be an unauthorized client.

In a traditional approach, detection of reused authenticators is performed by maintaining a record of all authenticators (and pre-authenticators) received within a prior pre-set period of time. The examining server (AS 402, TGS 404, of the like) would compare a received authenticator to the stored authenticators in the prior pre-set period of time. If a match is found, than the examining server would assume the authenticator is being reused by an unauthorized client. However, this approach may result in a significant load on the examining server, slowing down the authentication and access process.

This problem is addressed by binding the authenticator to a physical client through the IP addresses. However, as an IP address may be misleading for clients residing behind a NAT server, the present invention stores those authenticators for further examination. That is, if TGS 404 determines that the client's local IP address is not the same as the client's remote IP address, then TGS 404 compares the received authenticator to the stored authenticators for a possible reuse of authenticators. By only performing this comparison for clients behind a NAT server, the present invention may greatly reduce the need to check pre/authenticators for possible reuse. In addition, even if the client is behind a NAT its pre/authenticators are still bound to one particular combination of remote and local IP addresses. This means that the server need only check the timestamp against a small set of pre/authenticators previously received from that one client (that combination of IP addresses) within the time window. This is typically a much smaller set than the global set of all pre/authenticators received from all clients within the time window (which a traditional Kerberos approach checks against).

Moreover, TGS 404 examines other parameters to validate the client, including the lifetime parameter, session key, user name, account name associated with the user, and the like If TGS 404 determines that the client is valid and authorized, TGS 404 is further configured to provide the client with the content ticket. In one embodiment, TGS 404 provides several content tickets, each of which is associated with a different content server. TGS 404 may determine which content server to provide the content tickets based in part on information received from CSDS 406. The content ticket may include a server readable portion that is signed by a public encryption key associated with TGS 404. Additionally, the server readable portion is encrypted with a public encryption key associated with the receiving content server. Moreover, the server readable portion may include information associated with the client's local and remote IP addresses, the user's account, lifetime parameter, a portion of application content, such as a application tile, version information or the like, and a session key. The identified content server may be configured to perform substantially the same mechanisms to authenticate the client, as described above for TGS 404.

Figure 2:
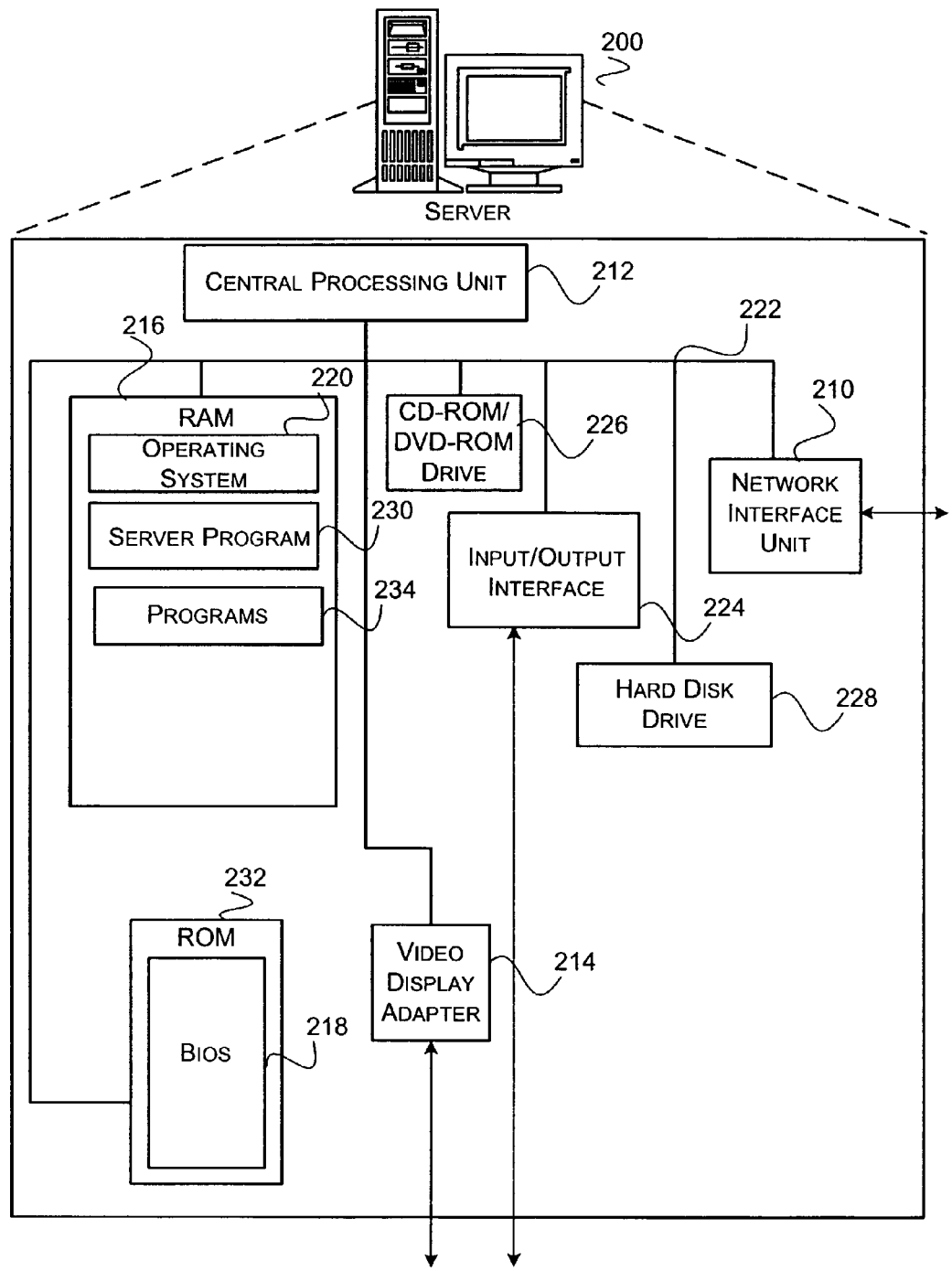
FIG. 2 illustrates a functional block diagram of one embodiment of a server as shown in FIG. 1.

FIG. 2 illustrates a functional block diagram of one embodiment of a server, such as master application server 102, application server 106, NAT server 104, and content server 120, or the like, as shown in FIG. 1. Server 200 may include many more components than those shown in FIG. 2. However, the components shown are sufficient to disclose an illustrative embodiment for practicing the present invention.

As shown in figure, server 200 may be connected to network 110, or other communications network, via network interface unit 210. Network interface unit 210 includes the necessary circuitry for connecting server 200 to network 110, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. This component may comprise a general-purpose server operating system, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules, applications, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site, application server site, authentication site, or the like. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by application servers, content servers, and the like. For example, customer databases, product databases, image databases, and relational databases may be stored.

Figure 3:
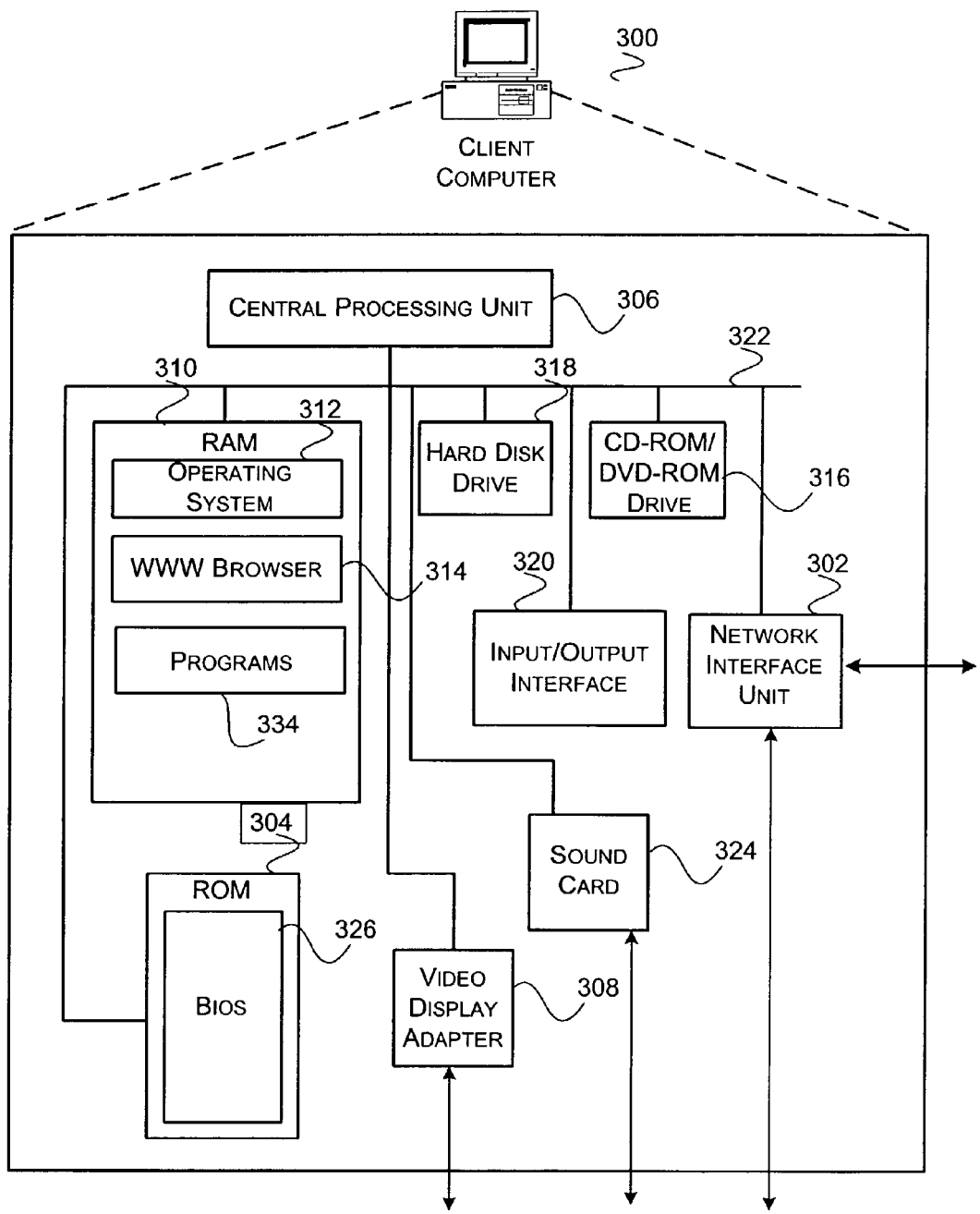
FIG. 3 illustrates a functional block diagram of one embodiment of a client as shown in FIG. 1.

FIG. 3 illustrates a functional block diagram of one embodiment of a client computer as shown in FIG. 1. Client computer 300 may include many more components than those shown in FIG. 3. However, the components shown are sufficient to disclose an illustrative embodiment for practicing the present invention.

As shown in FIG. 3, client computer 300 includes network interface unit 302 for connecting to a-LAN or WAN, or for connecting-remotely to a LAN or WAN. The network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300, and enabling a user to request access to a server, to play applications, and the like. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

Generalized Operation

The operation of certain aspects of the present invention will now be described with respect to FIGS. 5-14, in accordance with the present invention.

Figure 5:
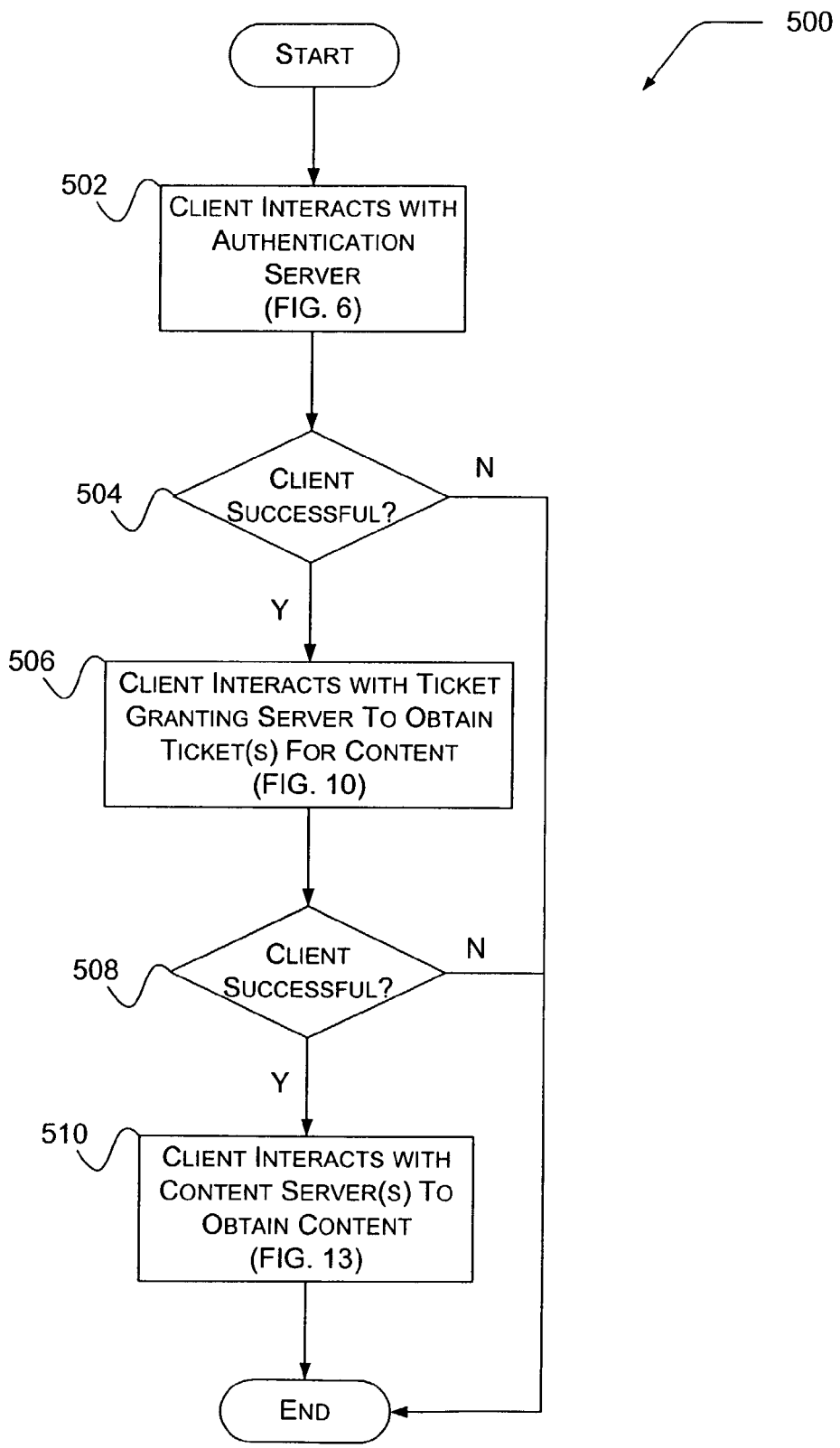
FIG. 5 illustrates a flow diagram generally showing one embodiment of a process for enabling authentication of a client.

FIG. 5 illustrates a flow diagram generally showing one embodiment of a process for enabling authentication of a client. As shown in the figure, process 500 begins, after a start block, at block 502, which is described in more detail in conjunction with FIG. 6. Briefly, however, at block 502 a client interacts with an authentication server to obtain a ticket granting ticket (TGT).

Processing continues at decision block 504, where a determination is made whether the client successfully obtained the TGT. If the client was unsuccessful, the processing ends. However, if the client was successful, process 500 continues to block 506. Block 506 is described in more detail in conjunction with FIG. 10. Briefly, however, at block 506, a client interacts with a Ticket Granting Server (TGS) to obtain a Content Ticket.

Processing continues at decision block 508, where a determination is made whether the client successfully obtained a Content ticket. If the client is unsuccessful, processing ends. However, if the client is successful, process 500 proceeds to block 510. Block 510 is described in more detail in conjunction with FIG. 13. Briefly, however, at block 510, a client interacts with a Content Server (CS) to obtain desired content. Upon completion of block 510, process 500 ends.

Figure 6:
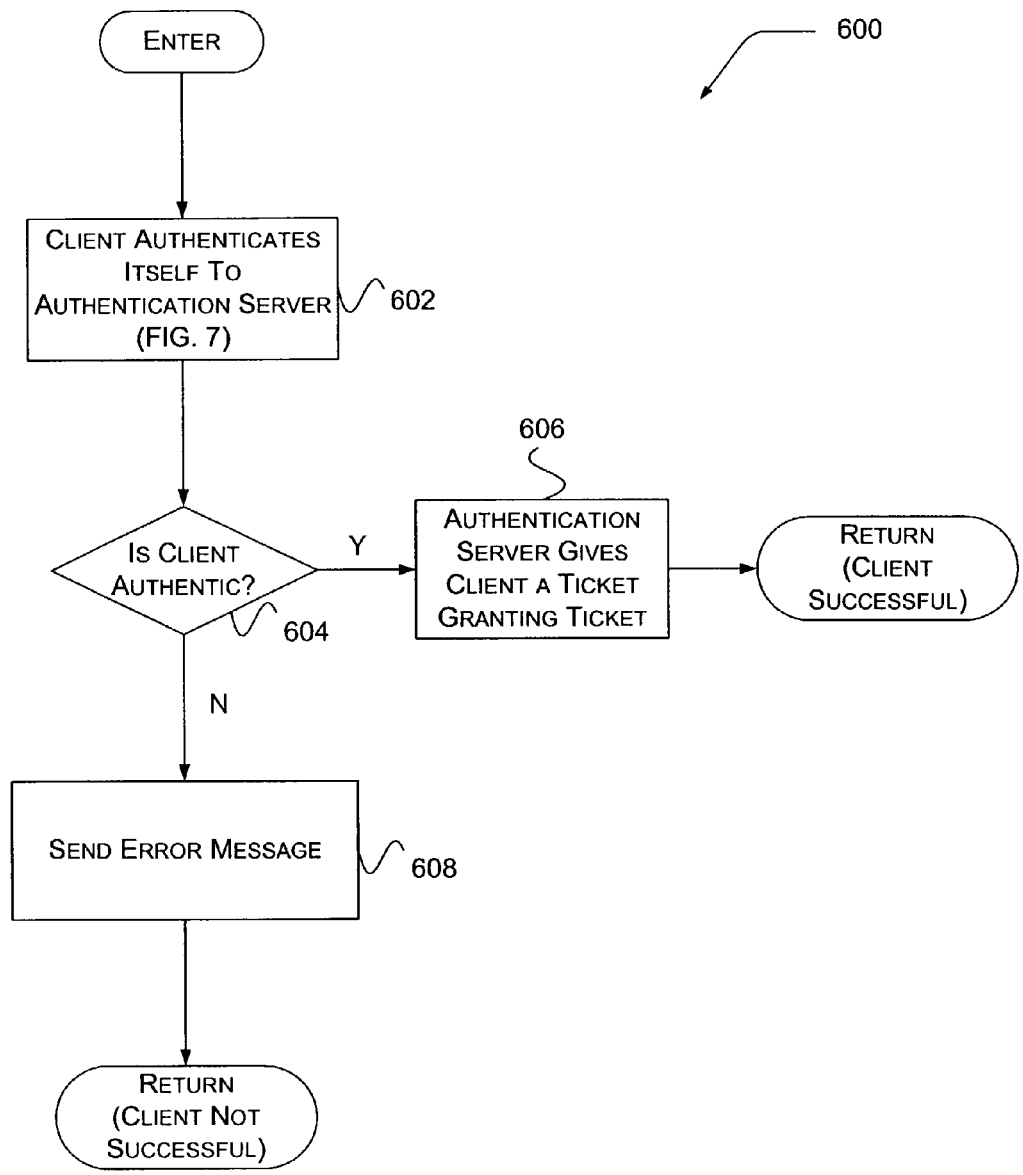
FIG. 6 illustrates a flow diagram generally showing one embodiment of a process for obtaining a ticket granting ticket.

FIG. 6 illustrates a flow diagram generally showing one embodiment of a process for obtaining a ticket granting ticket, in accordance with the present invention. Process 600 may be entered from block 502 in FIG. 5.

Figure 7:
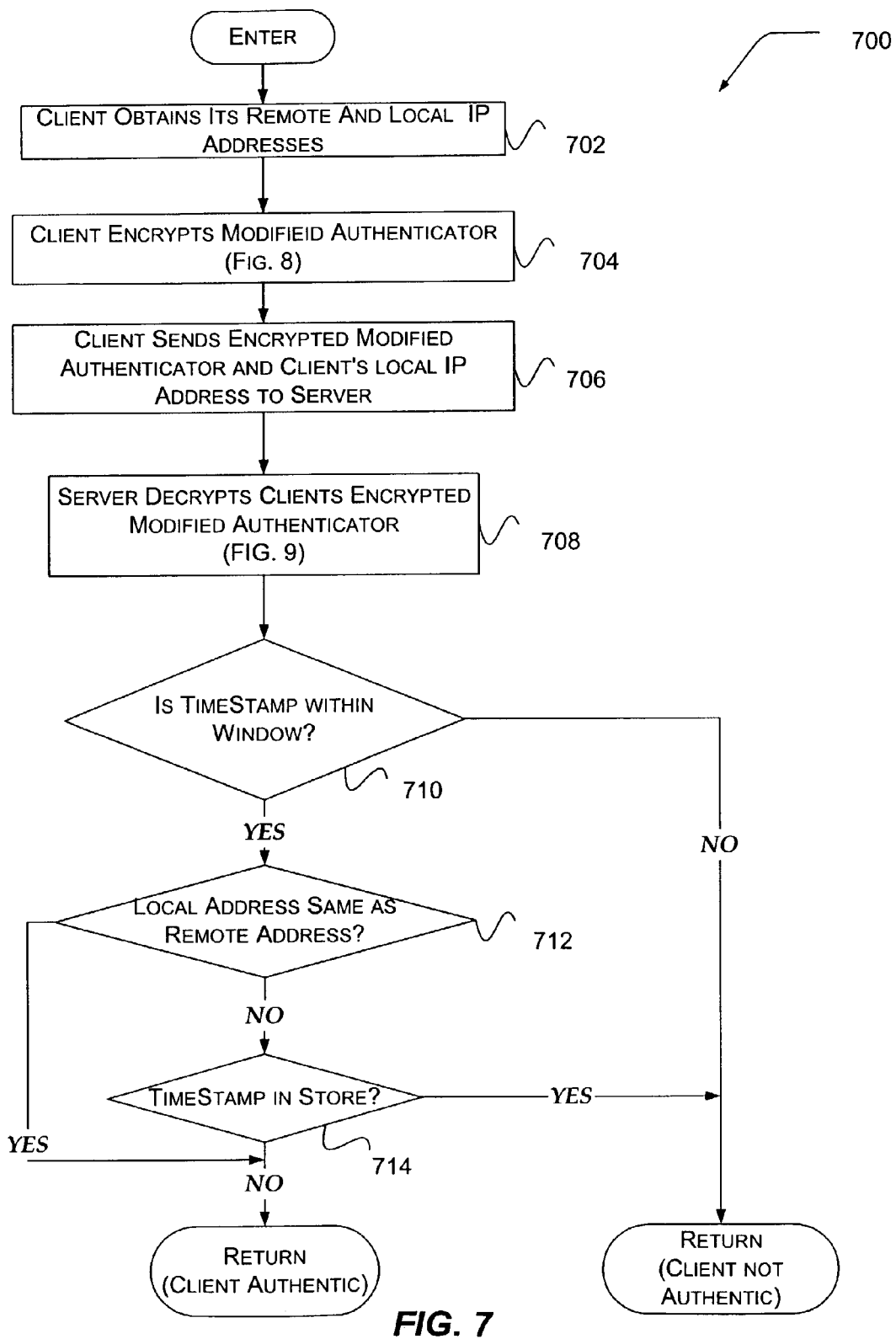
FIG. 7 illustrates a flow diagram generally showing one embodiment of a process for authenticating a client by an authentication server.

As shown in the figure, process 600 begins, after an enter block, at block 602, which is described in more detail in conjunction with FIG. 7. Briefly, however, at block 602, a client authenticates itself to an authentication server.

Process continues at decision block 604, where a determination is made whether the client is authentic. If it is determined that the client is authentic, process 600 proceeds to block 606. Otherwise, process 600 proceeds to block 608.

At block 606, an authentic client is provided a TGT by the authentication server. In one embodiment of the invention, the TGT includes a client readable portion, and a server readable portion. The client readable portion includes a session key, lifetime parameter, a message authentication code, and the like. The client readable portion also be encrypted employing the user's hashed salted password. The server readable portion includes the client's local and remote IP addresses, session key, lifetime parameter, user name, user account information, and the like. The server readable portion may also be signed by the public encryption key associated with the authentication server. Moreover, the server readable portion is encrypted employing a public encryption key associated with the ticket-granting server (TGS). Upon completion of block 606, process 600 returns to block 502 in FIG. 5 to perform other actions.

At block 608, the client may be provided an error message indicating that the client is not authenticated. In one embodiment, the client is also provided a clock time associated with the authentication server. Providing the clock time may enable the client to readjust its clock time, should the client's clock be out of synchronization with the authentication server. Upon completion of block 608, process 600 returns to block 502 in FIG. 5 to perform other actions.

FIG. 7 illustrates a flow diagram generally showing one embodiment of a process for authenticating a client by an Authentication Server, in accordance with the present invention. Process 700 may be entered from block 602 in FIG. 6.

As shown in the figure, process 700 begins, after an enter block, at block 702, where the client obtains its local and remote IP addresses. In one embodiment, the client obtains its local IP address by invoking a system call, or the like. If the client is behind resides behind a NAT server, the local IP address may not be the same as the client's remote IP address. Moreover, the client may not have ready access to its remote IP address. Therefore, in one embodiment, the client may obtain its remote IP address by a prior communication with the authentication server, a system call to another server such as the NAT server, or the like. For example, the client may make a connection to the authentication server. As part of an initial challenge/response, protocol negotiation, or the like, the authentication server may send to the client the client's remote IP address based a remote peer address of a socket that the client connects over, or the like. Moreover, the client may obtain its local IP address from a socket that it employs to connect to the authentication server.

Process 700 then continues to block 704. Block 704 is described in more detail in conjunction with FIG. 8. Briefly, however, at block 704, the client employs its local and remote IP addresses to generate and encrypt a modified authenticator. In one embodiment, the modified authenticator comprises a timestamp that is combined with a cryptographically strong digest of a concatenation of the client's local and remote IP addresses. Combining the addresses with the timestamp may be performed by virtually any information-preserving and reversible mechanism, including an exclusive or, and the like.

Processing continues to block 706, where the client sends the encrypted modified authenticator, along with its local and remote IP addresses to the authentication server. Process 700 continues to block 708, which is described in more detail in conjunction with FIG. 9. Briefly, however, at block 708, the authentication server decrypts the client's encrypted modified authenticator and returns the timestamp.

Process 700 continues to decision block 710, where a determination is made whether the timestamp is within a time window established by the authentication server. The timestamp may be outside of the established time window for a variety of reasons. For example, the client's time clock may not be sufficiently synchronized to the clock associated with the authentication server. As another example, if the IP addresses employed by the authentication server to decipher the modified authenticator are incorrect, the timestamp will likely be outside of the server's established time window. Therefore, if at decision block 710, the timestamp is determined to be outside the established time window, the client is deemed not to be authentic, and process 700 returns to performing other actions. If however, the timestamp is within the established time window, processing continues to decision block 712.

At decision block 712, a determination is made whether the local IP address of the client is the same as the client's remote IP address. In one embodiment, the authentication server may elect to employ the remote IP address provided by the client. The authentication server may also elect to examine a TCP/IP header associated with the client's request for authentication to determine a remote IP address associated with the client. However, the authentication server elects to obtain the remote IP address, if it is determined to be different from the client's local IP address, the authentication server presumes that the client is behind a NAT server, and processing proceeds to decision block 714. Otherwise, processing continues to decision block 716.

At decision block 714, a determination is made whether the deciphered timestamp is equal to a stored timestamp associated with the client. If it is determined that there is a stored timestamp that is equal to the deciphered timestamp, then it is assumed that the user is attempting to improperly reuse the timestamp. The client is determined not to be authentic and processing returns to block 602 in FIG. 6 to perform other actions. Otherwise, processing continues to decision block 716.

At decision block 716, a determination is made whether an remote IP address associated information provided by the client matches an IP address obtained by a variety of other approaches, including a system call, examination of a TCP/IP packet associated with the client, and the like. If it is determined that the client's provided remote IP address does not match the IP address obtained through another approach then it is assumed that the modified authenticator is being reused improperly, a DHCP or NAT address or the like is changed. In any event, the client is deemed not authentic and processing returns to block 602 in FIG. 6 to perform other actions.

Alternatively, if, at decision block 716 it is determined that the client's provided remote IP address doe match the IP address obtained through another approach, then the client is deemed authentic. Processing returns to block 602 in FIG. 6 to perform other actions.

Figure 8:
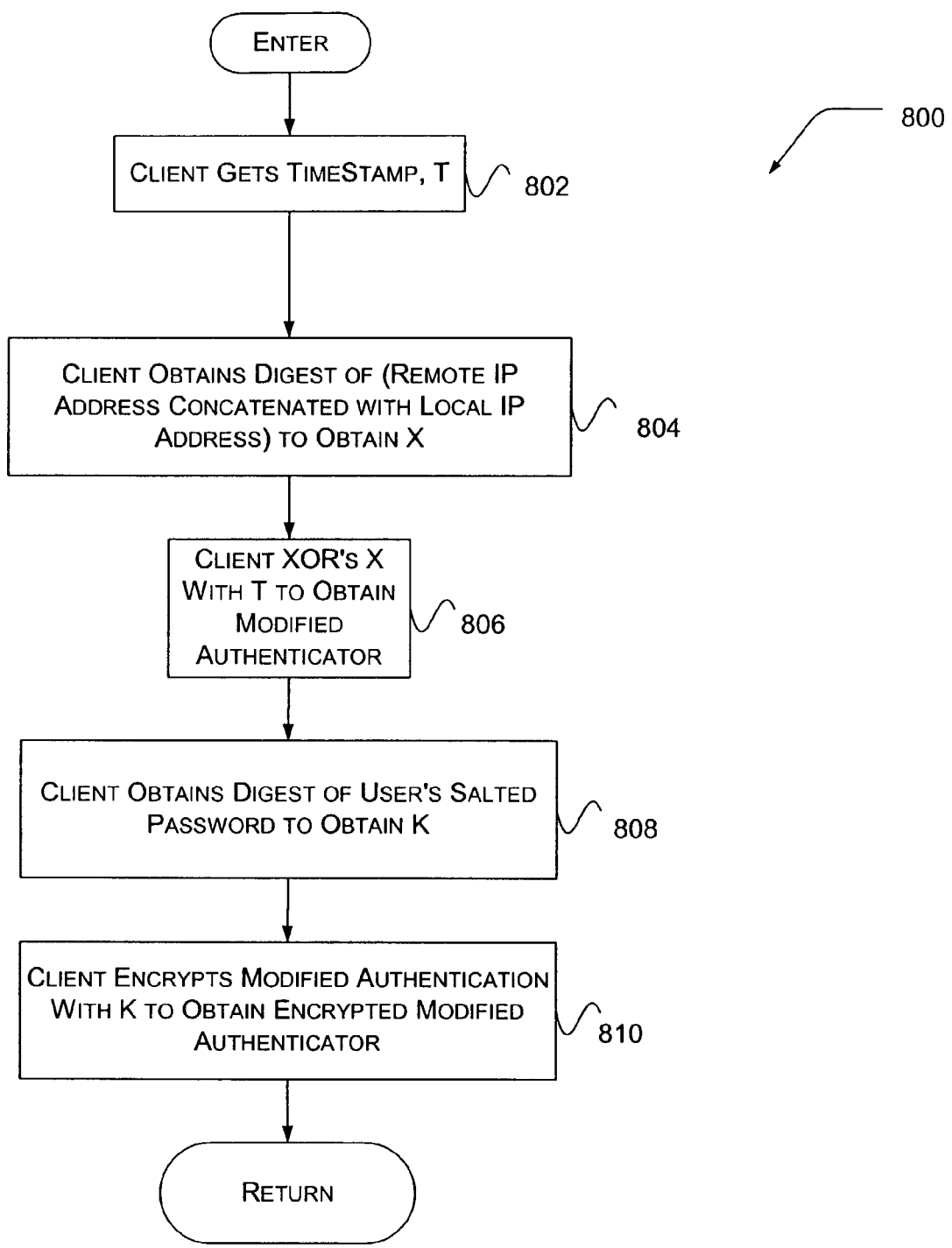
FIG. 8 illustrates a flow diagram generally showing one embodiment of a process for generating an encrypted modified authenticator.

FIG. 8 illustrates a flow diagram generally showing one embodiment of a process for generating an encrypted modified authenticator, in accordance with the present invention. FIG. 8 may be entered from block 704 in FIG. 7. As shown in the figure, process 800 begins, after an enter block, at block 802, where the client obtain a timestamp, T. In one embodiment, the timestamp T is obtained by a system call to a clock routine, or the like. It is expected that the client clock is substantially synchronized with the authentication server's clock. Otherwise, a skewed clock signal may result in the client being found to be improperly unauthenticated. Processing continues to block 804.

At block 804, the client concatenates its local and remote IP addresses together to provide a concatenated address value X. In one embodiment, the result of the concatenated address value X is truncated to 64 bits. In another embodiment, the entire digest is employed. Process 800 then proceeds to block 806, where a cryptographically strong digest of the concatenated address value X is exclusive or'ed with timestamp T to provide the modified authenticator for the client. However, the addresses may be combined with the timestamp by virtually any information-preserving and reversible mechanism. The cryptographically strong digest may be obtained by employing a variety of hashing mechanisms, including SHA1, and others such as described above. Process 800 binds the client's IP address to the timestamp to minimize sharing of timestamps. Processing then continues to block 808.

At block 808, the client generates a digest K (or hash) of the user's salted password, employing virtually any of a variety of hashing mechanisms, including those described above. Processing then proceeds to block 810, where digest K is employed to encrypt the modified authenticator for the authentication server. In one embodiment, a truncated digest K is employed. In another embodiment, the entire digest K is employed. When the modified authenticator is to be sent to the TGS or Content Server, the modified authenticator is encrypted employing a session key obtained from the authentication server. Upon completion of block 810, process 800 returns to block 704 in FIG. 7 to perform other actions.

Figure 9:
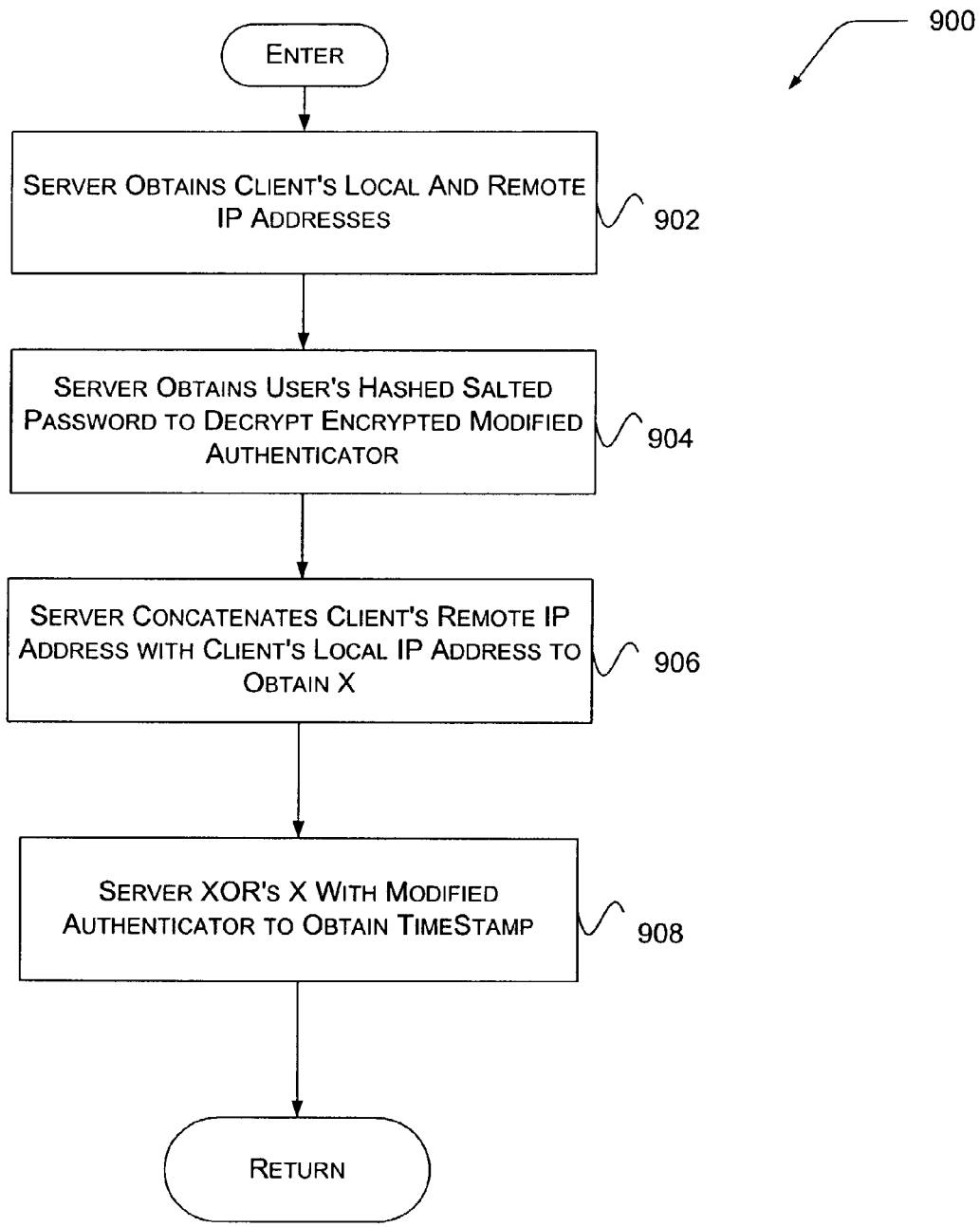
FIG. 9 illustrates a flow diagram generally showing one embodiment of a process for obtaining a timestamp from a modified authenticator.

FIG. 9 illustrates a flow diagram generally showing one embodiment of a process for obtaining a timestamp from a modified authenticator, in accordance with the present invention. Process 900 may be entered from block 708 in FIG. 7 described above. Process 900 begins, after an enter block, at block 902, where the client's local and remote IP addresses are obtained. In one embodiment, the client's remote IP address is obtained by examining a TCP/IP packet header associated with the client. The client's local IP address may be obtained from the client's request for authentication. Moreover, the server may obtain the client's local and remote IP addresses by decrypting the server readable portion of a received content ticket.

Processing continues to block 904, where the user's hashed salted password is obtained. In one embodiment, the user's hashed salted password may have been saved during a prior communication with the client. At block 904, the server employs the user's hashed salted password to decrypt the encrypted modified authenticator. Processing flows to block 906.

At block 906, the client's local and remote IP addresses are concatenated and hashed to obtain a value X. In one embodiment, value X is truncated to a 64-bit value. Processing continues to block 908, where a cryptographically strong digest of value X is exclusive or'ed with the modified authenticator to obtain a timestamp associated with the client. However, the addresses may be combined with the timestamp by virtually any information-preserving and reversible mechanism. Upon completion of block 908, process 900 returns to block 708 in FIG. 7 to perform other actions.

Figure 10:
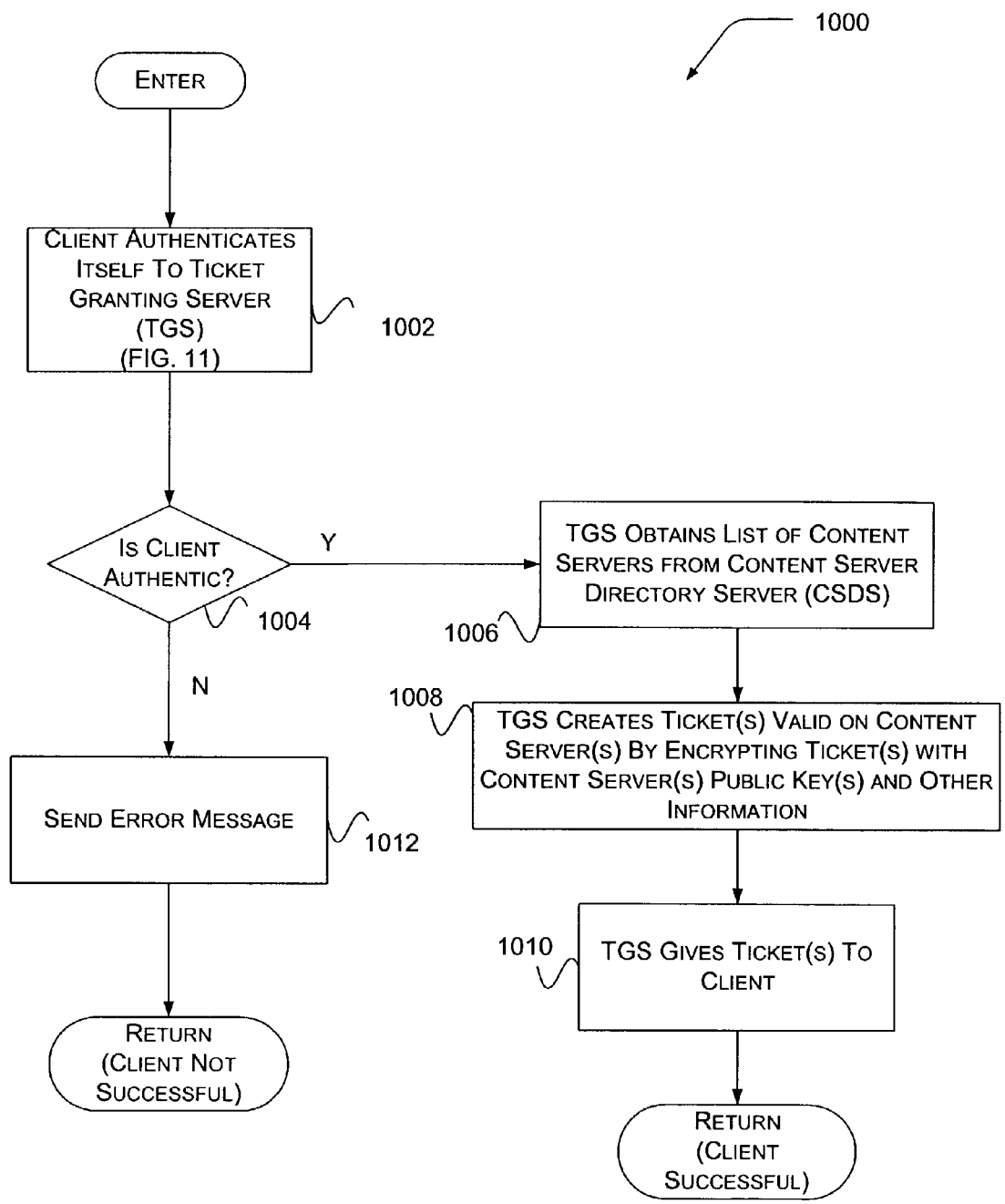
FIG. 10 illustrates a flow diagram generally showing one embodiment of a process for obtaining a content ticket.

FIG. 10 illustrates a flow diagram generally showing one embodiment of a process for obtaining a content ticket, in accordance with the present invention. Process 1000 may be entered from block 506 in FIG. 5 described above.

As shown in the figure, process 1000 begins, after an enter block, at 1002. Block 1002 is described in more detail below, in conjunction with FIG. 11. Briefly, however, at block 1002, the client is authenticated by a ticket-granting server (TGS).

Processing continues at decision block 1004, where a determination is made whether the client is authenticated by the TGS. If the client is authentic, process 1000 continues to block 1006; otherwise, the process continues to block 1012.

At block 1012, an error message is sent to the unauthenticated client. In one embodiment, the error message includes a clock time. In another embodiment, messages are sent to other servers, such as content servers, message servers, authentication servers, and the like providing notice that the client is not authentic. Process 1000 then returns to block 506 in FIG. 5 to perform other actions.

At block 1006, the TGS obtains a list of content servers that may be employed by the authenticated client. The list may be determined by a variety of criteria, including the client's location, user's account, client's IP addresses, load on a content server, and the like. In one embodiment, the TGS obtains the list from a content server directory server (CSDS). Several content servers may be selected from the list. Process 1000 continues to block 1008, where content tickets are generated for each of the selected content servers. Content tickets are substantially similar to a ticket granting ticket. Content ticket, however, may be bound to a unique combination of information, including a client's IP addresses, user account, content sought by the client, a particular content server, and the like. In one embodiment, the content server also includes an application identifier and version identifier associated with the content sought by the client. Moreover, the server readable portion of the content ticket may be signed by the ticket granting server's private encryption key. The server readable portion may also be encrypted employing a public encryption key associated with a particular content server. Processing flows then to block 1010, where the content tickets are sent to the client. Upon completion of block 1010, processing returns to block 506 in FIG. 5, to perform other actions.

Figure 11:
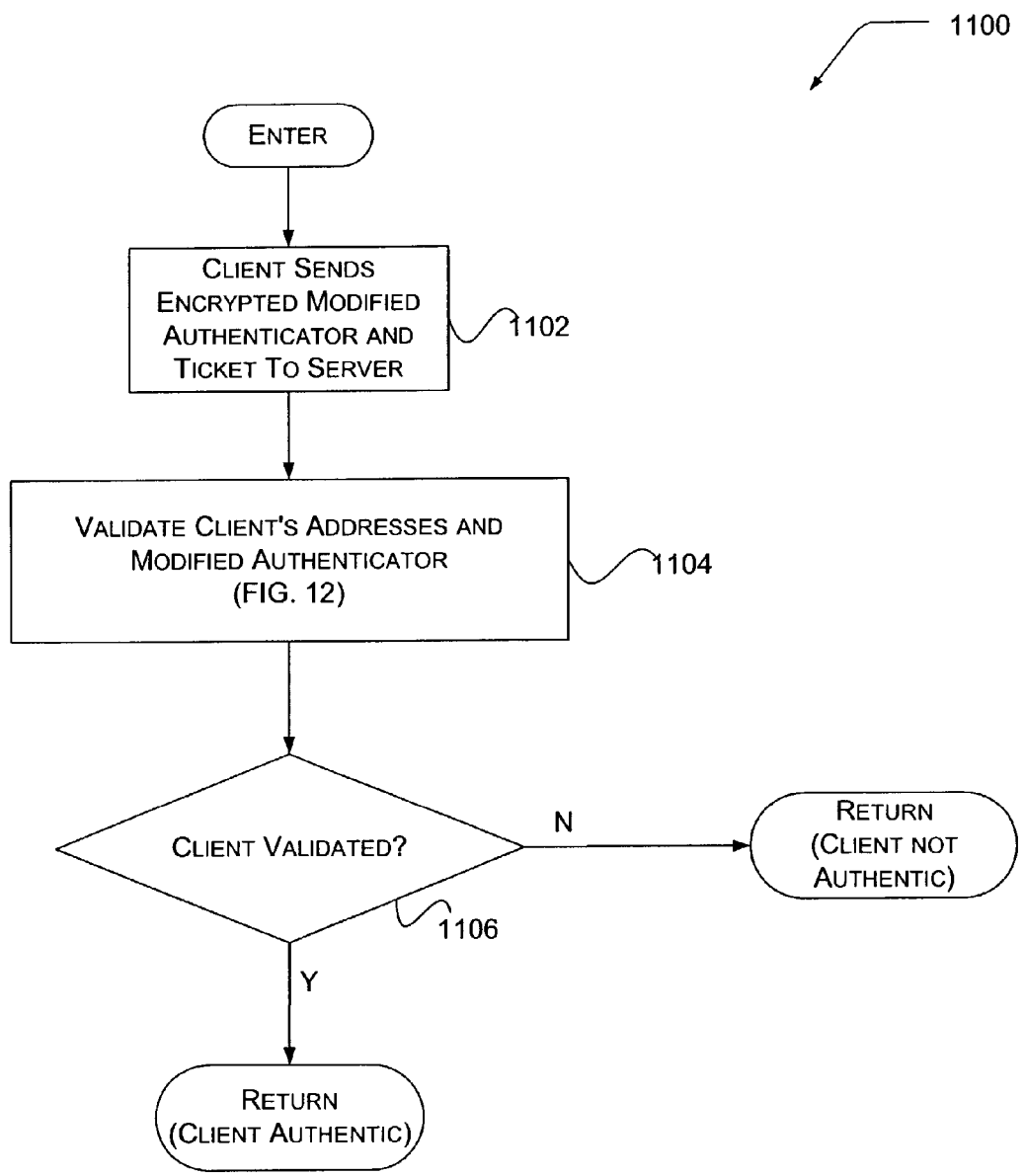
FIG. 11 illustrates a flow diagram generally showing one embodiment of a process for authenticating a client by a server.

FIG. 11 illustrates a flow diagram generally showing one embodiment of a process for authenticating a client by a server, in accordance with the present invention. Process 1100 may be entered from block 1002 in FIG. 10, where the client is to be authenticated by a ticket-granting server. Process 1100 may also be entered from block 1302 in FIG. 13, where the client is to be authenticated by a content server.

As shown in the figure, process 1100 begins, after an enter block, at 1102, where an encrypted modified authenticator and ticket is sent to a server. Block 1102 is substantially similar to FIG. 8, described above. However, rather than employing the user's hashed salted password to encrypt the modified authenticator, block 1102 employs the session key obtained from the authentication server. Process 1100 then continues to block 1104.

Block 1104 is described in more detail below in conjunction with FIG. 12. Briefly, however, at block 1104, the client's IP addresses and modified authenticator are validated. Process 1100 proceeds to decision block 1106, where a determination is made whether the client is valid. In one embodiment, a signal is provided that indicates whether the client is authentic, or not. Upon completion of decision block 1106, processing returns to perform other actions.

Figure 12:
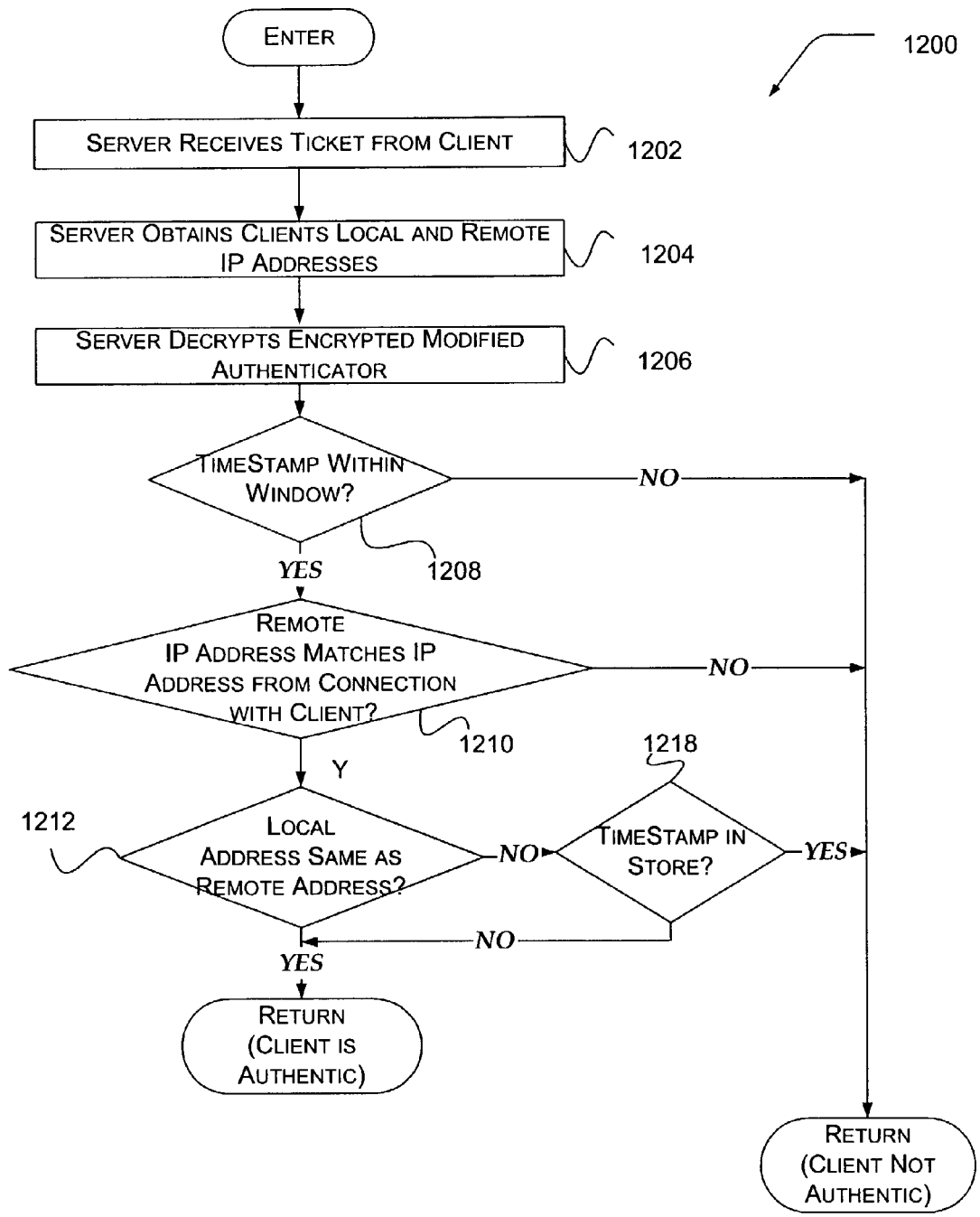
FIG. 12 illustrates a flow diagram generally showing one embodiment of a process for validating a client's IP addresses.

FIG. 12 illustrates a flow diagram generally showing one embodiment of a process for validating a client's IP addresses, in accordance with the present invention. Process 1200 is entered from block 1106 in FIG. 11.

As shown in the figure, process 1200 begins, after an enter block, at 1202, where a ticket, including an encrypted modified authenticator, is received. Process 1200 continues to block 1204, where the client's local and remote IP addresses are obtained, substantially as described above in conjunction with block 902 in FIG. 9. Process 1200 continues to block 1206, where the encrypted modified authenticator is decrypted. Block 1206 employs substantially the same process at described in FIG. 9, above, to obtain a timestamp associated with the client. Processing continues to decision block 1208.

At decision block 1208, a determination is made whether the timestamp obtained at block 1206 is within a time window established by the server. If the timestamp is outside the time window, the process returns to block 1106 in FIG. 11 to perform other actions. Alternatively, if the timestamp is within the time window, processing continues to decision block 1210.

At decision block 1210, a determination is made whether an remote IP address associated information provided by the client matches an IP address obtained by a variety of approaches, including a system call, examination of a TCP/IP packet associated with the client, and the like. If it is determined that the client's provided remote IP address does not match the IP address obtained through other mechanisms, then it is assumed that the modified authenticator is being reused improperly. The client is deemed not authentic, and process 1200 returns to block 1106 in FIG. 11 to perform other actions.

Alternatively, at decision block 1210, if the remote IP address provided by the client matches the IP address obtained by other mechanisms, the process flows to decision block 1212.

At decision block 1212, a determination is made whether the client's local IP address is the same as the client's remote IP address. If the addresses are the different, then it is determined that the client is behind a NAT server, and processing continues to decision block 1218. Otherwise, processing returns to block 1106 in FIG. 11 to perform other actions.

At decision block 1218, a determination is made whether the timestamp obtained at block 1206 above matches a stored timestamp associated with the client. Stored timestamps may be obtained through communications with the client over a prior pre-set period of time. Moreover, by only examining stored timestamps for clients behind a NAT server, authentication time and storage space may be minimized over approaches that always examined stored timestamps.

If, at decision block 1218, it is determined that there is a match with the stored timestamp, the client is determined to be attempting to improperly reuse the timestamp, and is therefore deemed not authentic. Upon completion of decision block 1218, processing returns to block 1106 in FIG. 11 to perform other actions. Alternatively, if the timestamp does not match a stored timestamp associated with the client, the client is deemed authentic and processing returns to block 1106 in FIG. 11 to perform other actions.

Figure 13:
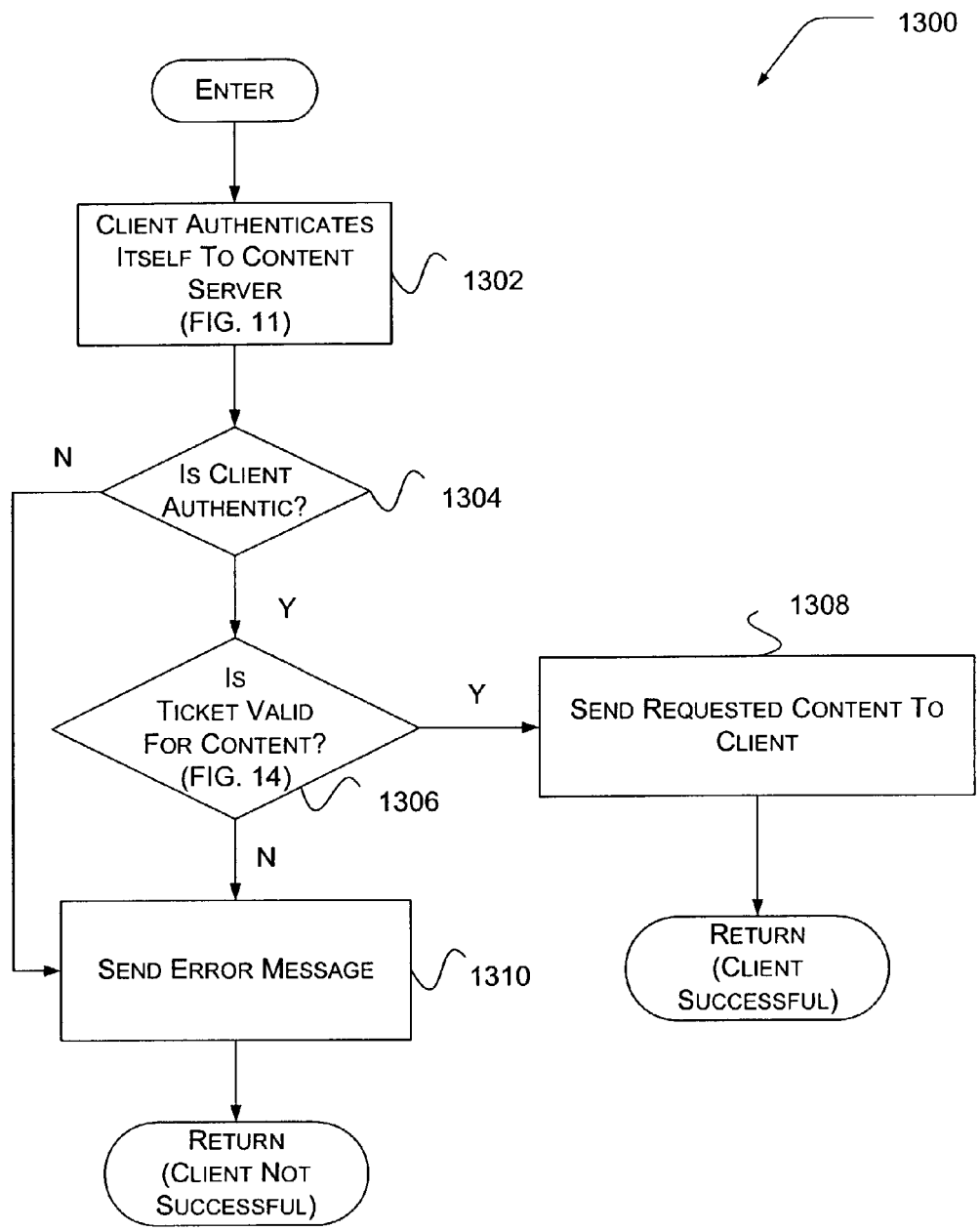
FIG. 13 illustrates a flow diagram generally showing one embodiment of a process for obtaining content from a Content Server.

FIG. 13 illustrates a flow diagram generally showing one embodiment of a process for obtaining content from a Content Server, in accordance with the present invention. Process 1300 is entered from block 510 in FIG. 5.

As shown in the figure, process 1300 begins, after an enter block, at block 1302. Block 1302 is described in more detail in conjunction with FIG. 11, above. Briefly, however, at block 1302, the client is authenticated by the content server.

Processing continues to decision block 1304, where a determination is made whether the client is authentic, based on the results from block 1302. If the client is found not to be authentic, the process flows to block 1310, where an error message is sent to the client. Additional actions may be taken at block 1310, including sending a message about the client to the target-granting server, and the like. Upon completion of block 1310, process 1300 returns to block 510 in FIG. 5, to perform other actions.

Alternatively, at decision block 1304, if it is determined that the client is authentic, the process continues to decision block 1306. Decision block 1306 is described in more detail in conjunction with FIG. 14. Briefly, however, at decision block 1306, a determination is made whether information within the content ticket is valid. If the information is not valid, processing continues to block 1310, as described above. Alternatively, if it is determined that the information is valid, processing flows to block 1308, where requested content is sent to the client. Upon completion of block 1308, process 1300 returns to block 510 in FIG. 5, to perform other actions.

Figure 14:
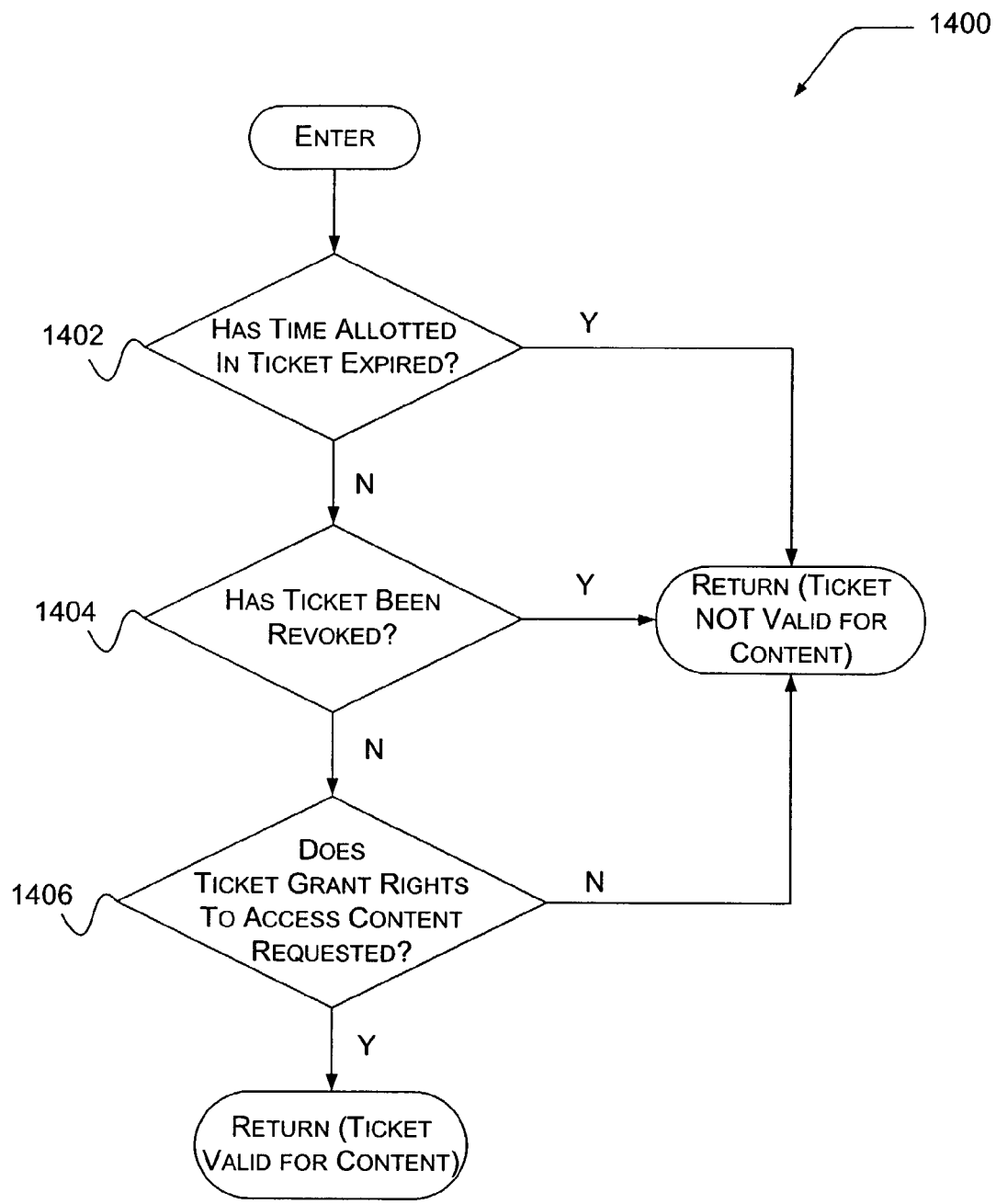
FIG. 14 illustrates a flow diagram generally showing one embodiment of a process for validating a content ticket, in accordance with aspects of the invention.

FIG. 14 illustrates a flow diagram generally showing one embodiment of a process for validating information within a content ticket, in accordance with aspects of the invention. Process 1400 is entered from block 1306 in FIG. 13.

As shown in the figure, process 1400 begins, after an enter block, at decision block 1402, where a determination is made whether the time allotted for the content ticket, as described by the lifetime parameter has expired. If the time allotted for the content ticket is expired, then the content ticket is deemed invalid, and process 1400 returns to block 1306 in FIG. 5, to perform other actions.

Alternatively, if at decision block 1402, the time allotted is not expired, the process continues to decision block 1404, where a determination is made whether the content ticket is revoked. A revocation may arise, for example, when the client is determined to be unauthenticated by another server, such as the ticket-granting server, which has informed the content server that the ticket is revoked. Revocation may also arise, where the content server has determined that there is an attempt to reuse this same content ticket. If it is determined that the ticket is revoked, the content ticket is deemed invalid, and processing returns to block 1306 in FIG. 5, to perform other actions.

Alternatively, if at decision block 1404, the content ticket is not revoked, processing continues decision block 1406, where a determination is made whether the content ticket includes information that grants the client access to the content requested. If the content ticket does not include information to grant access to the requested content, the content ticket is deemed invalid. Otherwise, the content ticket is deemed valid. Upon completion of decision block 1406, process 1400 returns to block 1306 in FIG. 5, to perform other actions.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method for authenticating a client, comprising:
   receiving an authentication request from the client that includes a modified authenticator encrypted with a hashed salted password associated with a user, wherein the modified authenticator binds a timestamp to the client by exclusive or'ing the timestamp with a remote address and a local address associated with the client, wherein the remote address is a remote IP address, and wherein the local address is a local IP address;
   determining a remote address and a local address associated with the client;
   decrypting the modified authenticator with the hashed salted password; and
   employing the remote address, local address, and decrypted modified authenticator to authenticate the client by:
      concatenating the remote address with the local address associated with the client;
      determining a cryptographic digest associated with the concatenated addresses;
      exclusive or'ing the cryptographic digest with the decrypted modified authenticator to extract the timestamp associated with the modified authenticator; and
      if the extracted timestamp is within a pre-determined time window,
   authenticating the client.

2. The method of claim 1, wherein determining the cryptographic digest further comprises determining a hash based on at least one of a Secure Hash Algorithm, Message Digest (MD), Korean Hash Algorithm Standard (KAS), and Tiger.

3. The method of claim 1, wherein employing the remote address, local address, and decrypted modified authenticator to authenticate the client further comprises:
   determining another timestamp associated with the modified authenticator; and
   when the client is behind a network address translator, authenticating the client when the other timestamp is equal to a stored timestamp; and
   when the client is not behind the network address translator, authenticating the client.

4. The method of claim 1, wherein determining a remote address associated with the client further comprises extracting an address from a packet header associated with the authentication request from the client.

5. The method of claim 4, wherein the packet header is a TCP/IP packet header.

6. The method of claim 4, wherein the remote address is a source IP address in the packet header.

7. The method of claim 1, further comprising providing the authenticated client with a ticket that enables the client to access content, wherein the ticket comprises at least one of a client readable portion, server readable portion, and another modified authenticator.

8. The method of claim 7, wherein other modified authenticator is encrypted employing a session key, wherein the session key is encrypted within the server readable portion of the ticket.

9. The method of claim 7, wherein the client readable portion is encrypted employing the hashed salted password associated with the user.

10. The method of claim 7, wherein the server readable portion is encrypted employing a digital public encryption key.

11. The method of claim 7, wherein the server readable portion is digitally signed.

12. The method of claim 1, wherein the hashed salted password is hashed based on at least one of a Secure Hash Algorithm, Message Digest (MD), Korean Hash Algorithm Standard (KAS), and Tiger.

13. The method of claim 1, wherein receiving an authentication request further comprises forwarding the authentication request through a server.

14. A system for authenticating a client over a network, comprising:
   the client that is configured to communicate an authentication request; and
   an application authentication server that is configured to perform actions, including:
      receiving an authentication request from the client that includes a modified authenticator encrypted with a hashed saLted password associated with a user, wherein the modified authenticator binds a timestamp to the client by combining the timestamp with a remote address and a local address associated with the client, wherein the remote address is a remote IP address, and wherein the local address is a local IP address;
      determining the remote address and the local address associated with the client;
      decrypting the modified authenticator with the hashed salted password; and
      employing the remote address, local address, and the timestamp to authenticate the client by exclusive or'ing a cryptographically strong digest of a concatenation of the remote address, and the local address associated with the decrypted modified authenticator to extract the timestamp associated with the client for the user, wherein the application authentication server further comprises:
   (a) an authentication server, that is configured to employ the remote address, local address, and the timestamp to authenticate the client, and to perform actions, including:
      (i) generating a ticket-granting ticket, wherein the ticket-granting ticket includes another modified authenticator that comprises another timestamp, remote address, and the local address associated with the client; and
   (b) a ticket-granting server that is enabled to receive the ticket-granting ticket, and to perform actions, including:
      (i) decrypting the other modified authenticator with a session key associated with the ticket-granting ticket;
      (ii) authenticating the client based in pad on the remote address, local address, and decrypted other modified authenticator; and (iii) if the client is authentic, providing a content ticket to the client, wherein the content ticket enables the client to access content.

15. The system of claim 14, wherein employing the remote address, local address, and timestamp to authenticate the client further comprises:
concatenating the remote address with the local address associated with the client;
determining a cryptographic digest associated with the concatenated addresses;
combining the cryptographic digest with another timestamp associated with the modified authenticator; and
if the other timestamp is within a pre-determined time window, authenticating the client.

16. The system of claim 15, wherein combining further comprises exclusive or'ing the cryptographic digest with the timestamp.

17. The system of claim 14, wherein determining the cryptographic digest further comprises determining a hash based on at least one of a Secure Hash Algorithm, Message Digest (MD), Korean Hash Algorithm Standard (KAS), and Tiger.

18. The system of claim 14, wherein employing the remote address, local address, and decrypted modified authenticator to authenticate the client further comprises:
determining a timestamp associated with the modified authenticator; and
when the client is behind a network address translator, authenticating the client when the timestamp is equal to a stored timestamp; and
when the client is not behind the network address translator, authenticating the client.

19. The system of claim 14, wherein determining a remote address associated with the client further comprises extracting an address from a packet header associated with the authentication request from the client.

20. The system of claim 19, wherein the packet header is a TCP/IP packet header.

21. The system of claim 14, wherein the application authentication sewer is configured to perform further actions, including providing the authenticated client with a ticket that enables the client to access content, wherein the ticket comprises at least one of a client readable portion, server readable portion, and another modified authenticator.

22. The system of claim 21, wherein other modified authenticator is encrypted employing a session key, wherein the session key is encrypted within the server readable portion of the ticket.

23. The system of claim 21, wherein the sewer readable portion is encrypted employing a digital public encryption key.

24. A computer-readable medium having stored thereon a data structure comprising data fields including a ticket granting ticket that is issued to a computer for a user, including an authentication data field containing data including a timestamp, a remote IP address, and a local IP address associated with the computer for the user, wherein the data including the IP remote address and the local IP address further comprises the timestamp associated with the user that is exclusive or'ed with a cryptographically strong digest of a concatenation of the IP remote address and the local IP address associated with the computer for the user, wherein the computer-readable medium includes a component employed to authenticate the computer for the user based on the data structure, and wherein the authentication data field is encrypted with a hashed salted user's password and a session key.

25. The computer-readable medium of claim 24, wherein the data structure further comprising:
a client readable data field, wherein the client readable data field is encrypted using a hashed salted password associated with the user;
a server readable data field, wherein the server readable data field includes a session key to decrypt the authentication data field.

26. An apparatus for authenticating a client, comprising:
a means for receiving an authentication request from the client that includes a modified authenticator encrypted with a hashed salted password associated with a user, wherein the modified authenticator binds a timestamp to the client by a means for combining the timestamp with a remote address and a local address associated with the client, wherein the remote address is a remote IP address, and wherein the local address is a local IP address;
a means for determining a remote address and a local address associated with the client;
a means for decrypting the modified authenticator with the hashed salted password; and
a means for employing the remote address, local address, and decrypted modified authenticator to authenticate the client by exclusive or'ing a cryptographically strong digest of a concatenation of the remote address, and the local address associated with the decrypted modified authenticator to extract the timestamp associated with the client for the user.

27. A method for authenticating a client, comprising:
determining an authentication data including a timestamp, a remote IP address, and a local IP address associated with a client for a user, wherein the authentication data including the IP remote address and the local IP address further comprises the timestamp associated with the user that is exclusive or'ed with a cryptographically strong digest of a concatenation of the IP remote address and the local IP address associated with the client for the user, wherein the authentication data is encrypted with at least a hashed salted user's password; and
authenticating the client for the user based on the authentication data; and
issuing to the client for the user, a ticket granting ticket, wherein the ticket granting ticket includes the authentication data.

28. The method of claim 27, wherein the authentication data is encrypted with at least a session key.

29. The method of claim 27, further comprising:
encrypting a client readable data field using a hashed salted password associated with the user; and
decrypting the authentication data using a session key.

30. A system for authenticating a client, comprising:
the client that is configured to communicate an authentication request; and
an application authentication server in communication with the client and configured to perform actions, including:
receiving the authentication request, wherein the authentication request is encrypted with a hashed salted password;
determining, in response to the authentication request, data including a timestamp, a remote IP address, and a local IP address associated with the client for a user, wherein the data including the IP remote address and the local IP address further comprises the timestamp associated with the user that is exclusive or'ed with a cryptographically strong digest of a concatenation of the IP remote address and the local IP address associated with the client for the user; and
authenticating the client based on the data.

31. The system of claim 30, wherein the application authentication server is further configured to issue to the client, a ticket granting ticket, wherein the ticket granting ticket includes the authentication data.

32. The system of claim 30, wherein the application authentication server is further configured to determine the remote IP address by extracting an address from a packet header associated with the authentication request.

33. A processor readable media that includes components for authenticating a client, the components performing actions, including:
- a first component for receiving an authentication request from the client that includes a modified authenticator encrypted with a hashed salted password associated with a user, wherein the modified authenticator binds a timestamp to the client by a means for combining the timestamp with a remote address and a local address associated with the client, wherein the remote address is a remote IP address, and wherein the local address is a local IP address;
- a second component for determining a remote address and a local address associated with the client;
- a third component for decrypting the modified authenticator with the hashed salted password; and
- a fourth component for employing the remote address, local address, and decrypted modified authenticator to authenticate the client by exclusive or'ing a cryptographically strong digest of a concatenation of the remote address, and the local address associated with the decrypted modified authenticator to extract the timestamp associated with the client for the user.

* * * * *